United States Patent
Zhang et al.

(10) Patent No.: US 12,069,292 B2
(45) Date of Patent: Aug. 20, 2024

(54) MOTION VECTOR DERIVATION FOR SUB-BLOCK IN AFFINE MODE

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 138 days.

(21) Appl. No.: 17/209,382

(22) Filed: Mar. 23, 2021

(65) Prior Publication Data
US 2021/0211713 A1  Jul. 8, 2021

Related U.S. Application Data

(63) Continuation of application No. PCT/IB2019/058032, filed on Sep. 23, 2019.

(30) Foreign Application Priority Data
Sep. 23, 2018  (WO) ................ PCT/CN2018/107169

(51) Int. Cl.
H04N 19/52 (2014.01)
H04N 19/176 (2014.01)
H04N 19/184 (2014.01)

(52) U.S. Cl.
CPC .......... *H04N 19/52* (2014.11); *H04N 19/176* (2014.11); *H04N 19/184* (2014.11)

(58) Field of Classification Search
CPC ..... H04N 19/176; H04N 19/184; H04N 19/52
See application file for complete search history.

(56) References Cited

U.S. PATENT DOCUMENTS 10,448,010 B2  10/2019  Chen et al.
10,560,712 B2   2/2020  Zou et al.
(Continued)

FOREIGN PATENT DOCUMENTS

CN  105163116 A  12/2015
CN  108432250 A   8/2018
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
(Continued)

*Primary Examiner* — Zhubing Ren
(74) *Attorney, Agent, or Firm* — Perkins Coie LLP

(57) ABSTRACT

A method of video processing includes: determining an affine mode type to be applied to a current block coded in an affine mode in a video frame, wherein the current block is split into a plurality of sub-blocks; and deriving motion information for each of the plurality of sub-blocks based on the affine mode type, at least one control point (CP) motion vector (MV) at a specific location being derived and stored for predicting other blocks to be processed subsequently.

19 Claims, 14 Drawing Sheets

(56) References Cited

U.S. PATENT DOCUMENTS

| | | | |
|---|---|---|---|
| 10,757,417 B2 | 8/2020 | Zhang et al. | |
| 10,778,999 B2 | 9/2020 | Li et al. | |
| 10,841,609 B1 | 11/2020 | Liu et al. | |
| 10,873,744 B2* | 12/2020 | Lee | H04N 19/139 |
| 2017/0272776 A1 | 9/2017 | Tourapis et al. | |
| 2018/0098062 A1* | 4/2018 | Li | H04N 19/70 |
| 2018/0098063 A1* | 4/2018 | Chen | H04N 19/139 |
| 2018/0192069 A1 | 7/2018 | Chen et al. | |
| 2019/0327482 A1* | 10/2019 | Lin | H04N 19/176 |
| 2019/0387250 A1* | 12/2019 | Boyce | H04N 19/523 |
| 2020/0045310 A1 | 2/2020 | Chen et al. | |
| 2020/0059651 A1* | 2/2020 | Lin | H04N 19/52 |
| 2020/0077113 A1* | 3/2020 | Huang | H04N 19/55 |
| 2020/0145688 A1 | 5/2020 | Zou et al. | |
| 2020/0213594 A1 | 7/2020 | Liu et al. | |
| 2020/0213612 A1 | 7/2020 | Liu et al. | |
| 2020/0359029 A1 | 11/2020 | Liu et al. | |
| 2020/0382771 A1 | 12/2020 | Liu et al. | |
| 2020/0382795 A1 | 12/2020 | Zhang et al. | |
| 2020/0396453 A1 | 12/2020 | Zhang et al. | |
| 2020/0396465 A1 | 12/2020 | Zhang et al. | |

FOREIGN PATENT DOCUMENTS

| | | |
|---|---|---|
| EP | 3331242 A1 | 6/2018 |
| WO | 2018126163 A1 | 7/2018 |

OTHER PUBLICATIONS

Chen et al. "CE4: Affine Merge Enhancement (Test 2.10)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0186, 2018.

JEM-7.0: https://jvet.hhi.fraunhofer.de/svn/svn_HMJEMSoftware/tags/ HM-16.6-JEM-7.0.

https://www.itu.int/rec/T-REC-H.265.

Xiu et al. "CE4.2.5: Simplifications on Advanced Temporal Motion Vector Prediction (ATMVP)," Joint Video Experts Team (JVET) of ITU-T SG 16 WP 3 and ISO/IEC JTC 1/SC 29/WG 11, 11th meeting, Ljubljana, SI, Jul. 10-18, 2018, document JVET-K0341, 2018.

International Search Report and Written Opinion from International Patent Application No. PCT/IB2019/058031 dated Dec. 10, 2019 (13 pages).

International Search Report and Written Opinion from International Patent Application No. PCT/IB2019/058032 dated Dec. 6, 2019 (13 pages).

International Search Report and Written Opinion from International Patent Application No. PCT/IB2019/058033 dated Dec. 16, 2019 (13 pages).

Zhou et al. "Non-CE4: A Study on the Affine Merge Mode," Joint Video Experts Team (JVET)of ITU-T SG 16 WP 3 and ISO/IEC JTC 1/SC 29/WG 1111th Meeting: Ljubljana, SI, Jul. 10-18, 2018, document JVET-K0052, 2018. (cited in CN201910901074.5 OA1 mailed May 11, 2022).

Zou et al. "Improved Affine Motion Prediction," Joint Video Exploration Team (JVET) of ITU-T SG 16 WP 3 and ISO/IEC JTC 1/SC 29/WG 11 3rd Meeting: Geneva, CH, May 26-Jun. 1, 2016, document JVET-C0062, 2016. (cited in CN201910901074.5 OA1 mailed May 11, 2022).

\* cited by examiner

MOTION VECTOR DERIVATION FOR SUB-BLOCK IN AFFINE MODE

CROSS-REFERENCE TO RELATED APPLICATION

This application is a continuation of International Application No. PCT/IB2019/058032 filed on Sep. 23, 2019 which claims the priority to and benefits of International Patent Application No. PCT/CN2018/107169, filed on Sep. 23, 2018. The entire disclosures of all the aforementioned patent applications are incorporated by reference as part of the disclosure of this application.

TECHNICAL FIELD

This patent document relates to video coding techniques, devices and systems.

BACKGROUND

Motion compensation (MC) is a technique in video processing to predict a frame in a video, given the previous and/or future frames by accounting for motion of the camera and/or objects in the video. Motion compensation can be used in the encoding of video data for video compression.

SUMMARY

This document discloses methods, systems, and devices related to the use of affine motion compensation in video coding and decoding.

In one example aspect, a method of video processing is disclosed. The method includes: determining an affine mode type to be applied to a current block coded in an affine mode in a video frame, wherein the current block is split into a plurality of sub-blocks; and deriving motion information for each of the plurality of sub-blocks based on the affine mode type, wherein at least one control point (CP) motion vector (MV) at a specific location is derived and stored for predicting other blocks to be processed subsequently.

In one example aspect, a method of video processing is disclosed. The method includes: determining an affine mode type to be applied to a current block coded in affine mode in a video frame, wherein the current block is split into a plurality of sub-blocks; and deriving motion vectors (MV) of the each of the plurality of sub-blocks directly from control point (CP) MVs of the neighboring block without from the CP MVs of the current block based on the determined affine mode type of the current block.

In another example aspect, an apparatus in a video system is proposed. The apparatus includes a processor and a non-transitory memory with instructions thereon, wherein the instructions upon execution by the processor, cause the processor to implement the above method.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

DETAILED DESCRIPTION

The present document provides several techniques that can be embodied into digital video encoders and decoders. Section headings are used in the present document for clarity of understanding and do not limit scope of the techniques and embodiments disclosed in each section only to that section.

1. Summary

This invention is related to video/image coding technologies. Specifically, it is related to affine prediction in video/image coding. It may be applied to the existing video coding standard like HEVC, or the standard (Versatile Video Coding) to be finalized. It may be also applicable to future video/image coding standards or video/image codec.

2. Introduction

Figure 1:
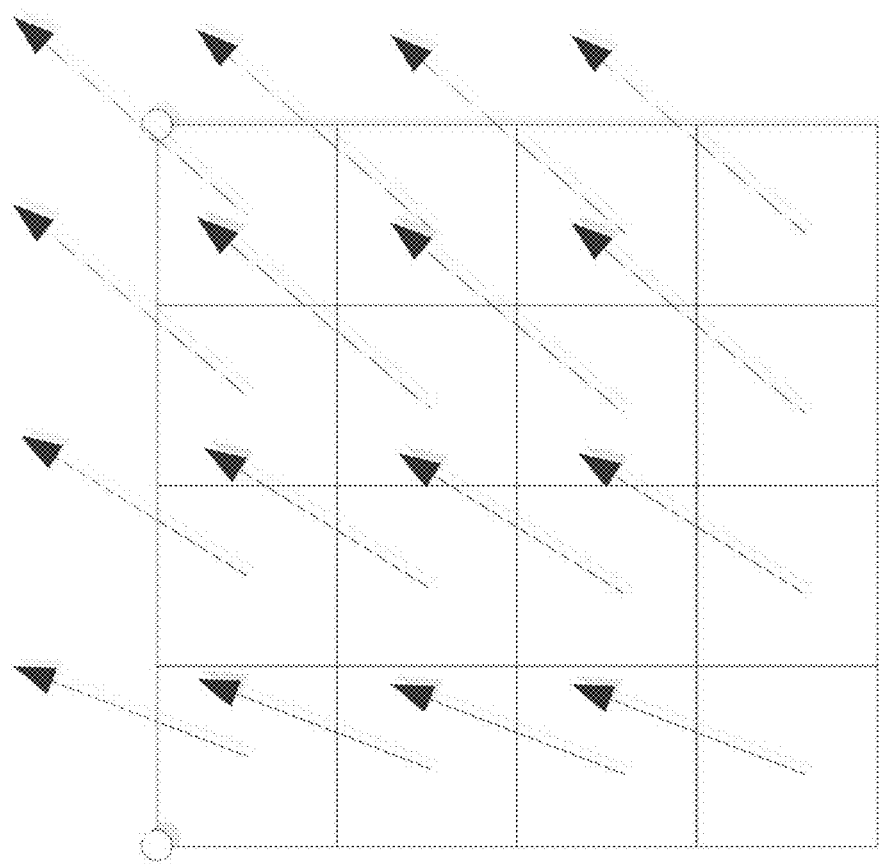
FIG. 1 shows an example of sub-block based prediction calculation.

Sub-block based prediction is first introduced into the video coding standard by HEVC Annex I (3D-HEVC). With sub-block based prediction, a block, such as a Coding Unit (CU) or a Prediction Unit (PU), is divided into several non-overlapped sub-blocks. Different sub-block may be assigned different motion information, such as reference index or Motion Vector (MV), and Motion Compensation (MC) is performed individually for each sub-block. FIG. 1 shows the concept of sub-block based prediction.

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO) and Frame-Rate Up Conversion (FRUC). Affine prediction has also been adopted into VVC.

1.1 Affine Prediction

Figure 2A:
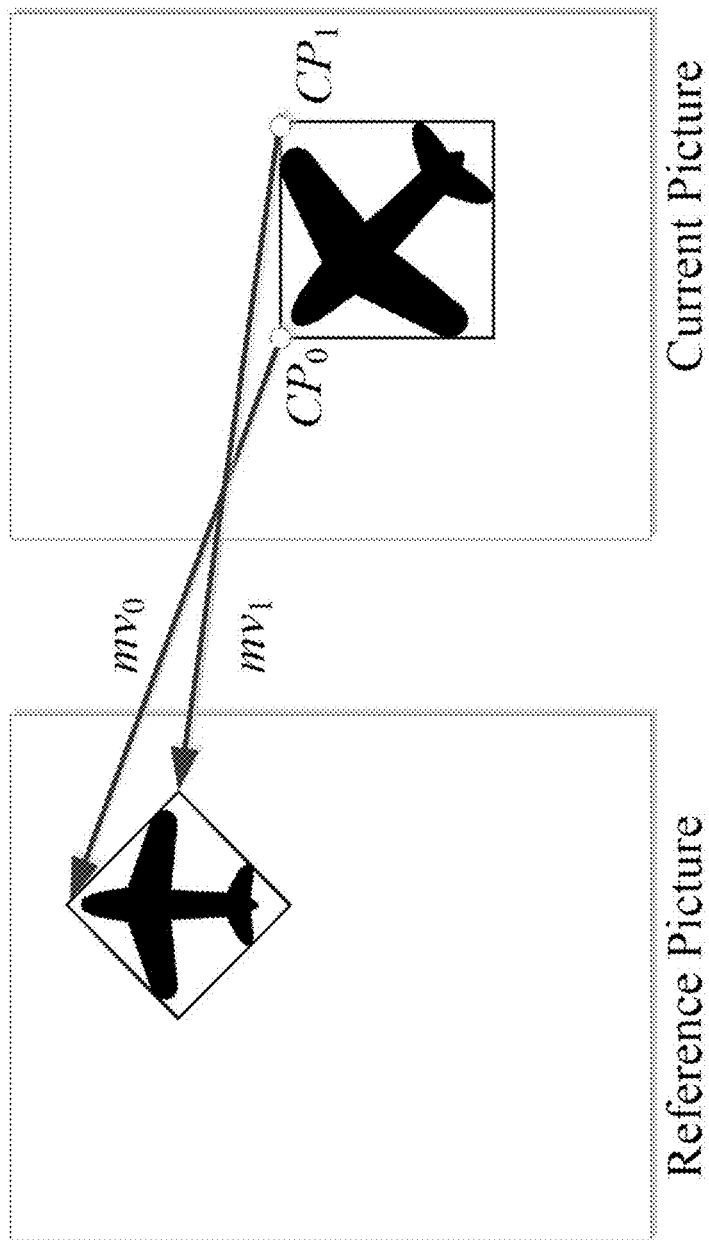
FIG. 2A-2B shows examples of Simplified affine motion model. (a) 4-parameter affine model; (b) 6-parameter affine model.
Figure 2B:
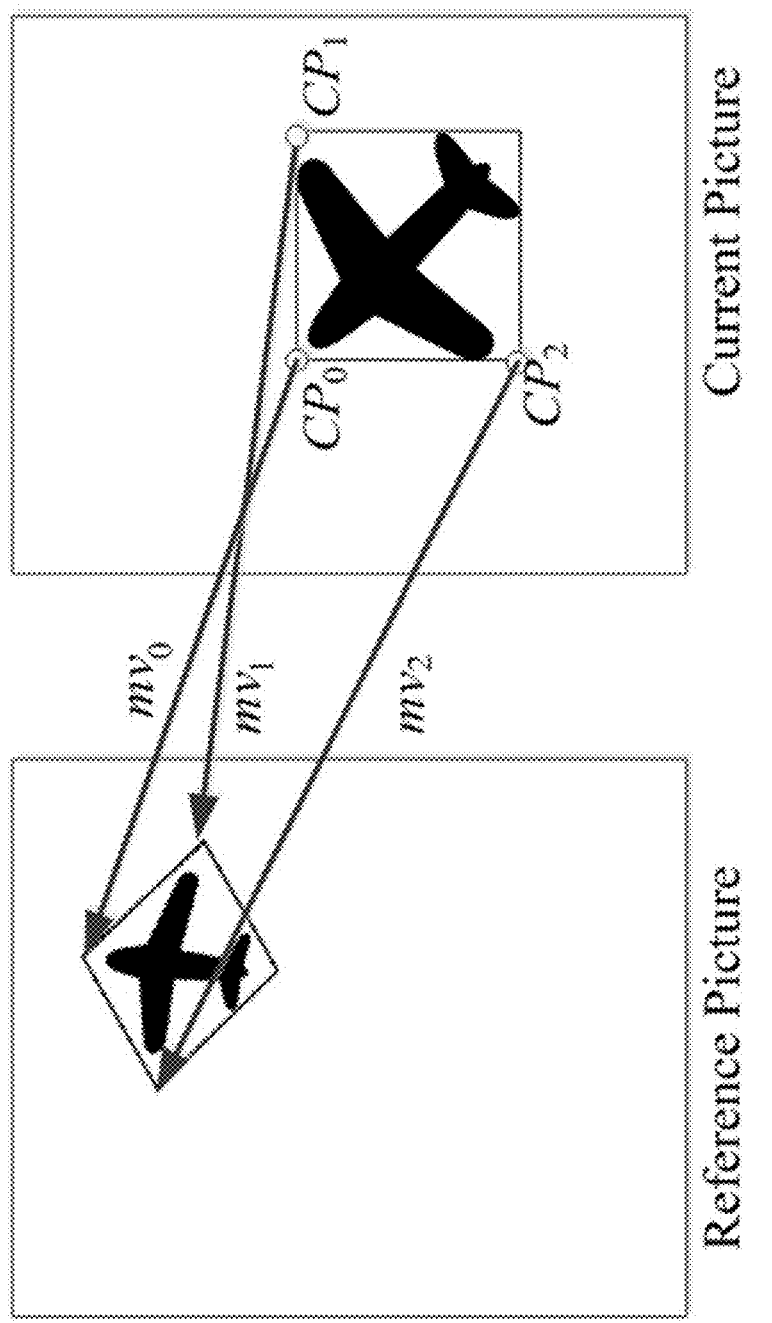

In HEVC, only translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown in FIG. 2, the affine motion field of the block is described by two (in the 4-parameter affine model) or three (in the 6-parameter affine model) control point motion vectors.

FIG. 2 shows a simplified affine motion model. (a) 4-parameter affine model; (b) 6-parameter affine model The motion vector field (MVF) of a block is described by the following equation with the 4-parameter affine model $$\begin{cases} mv^h(x, y) = \frac{(mv_1^h - mv_0^h)}{w}x - \frac{(mv_1^v - mv_0^v)}{w}y + mv_0^h \\ mv^v(x, y) = \frac{(mv_1^v - mv_0^v)}{w}x + \frac{(mv_1^h - mv_0^h)}{w}y + mv_0^v \end{cases} \quad (1)$$

and 6-parameter affine model:

$$\begin{cases} mv^h(x, y) = \frac{(mv_1^h - mv_0^h)}{w}x + \frac{(mv_2^h - mv_0^h)}{h}y + mv_0^h \\ mv^v(x, y) = \frac{(mv_1^v - mv_0^v)}{w}x + \frac{(mv_2^v - mv_0^v)}{h}y + mv_0^v \end{cases} \quad (2)$$

where $(mv^h_0, mv^v_0)$ is motion vector of the top-left corner control point, and $(mv^h_1, mv^v_1)$ is motion vector of the top-right corner control point and $(mv^h_2, mv^v_2)$ is motion vector of the bottom-left corner control point.

Figure 3:
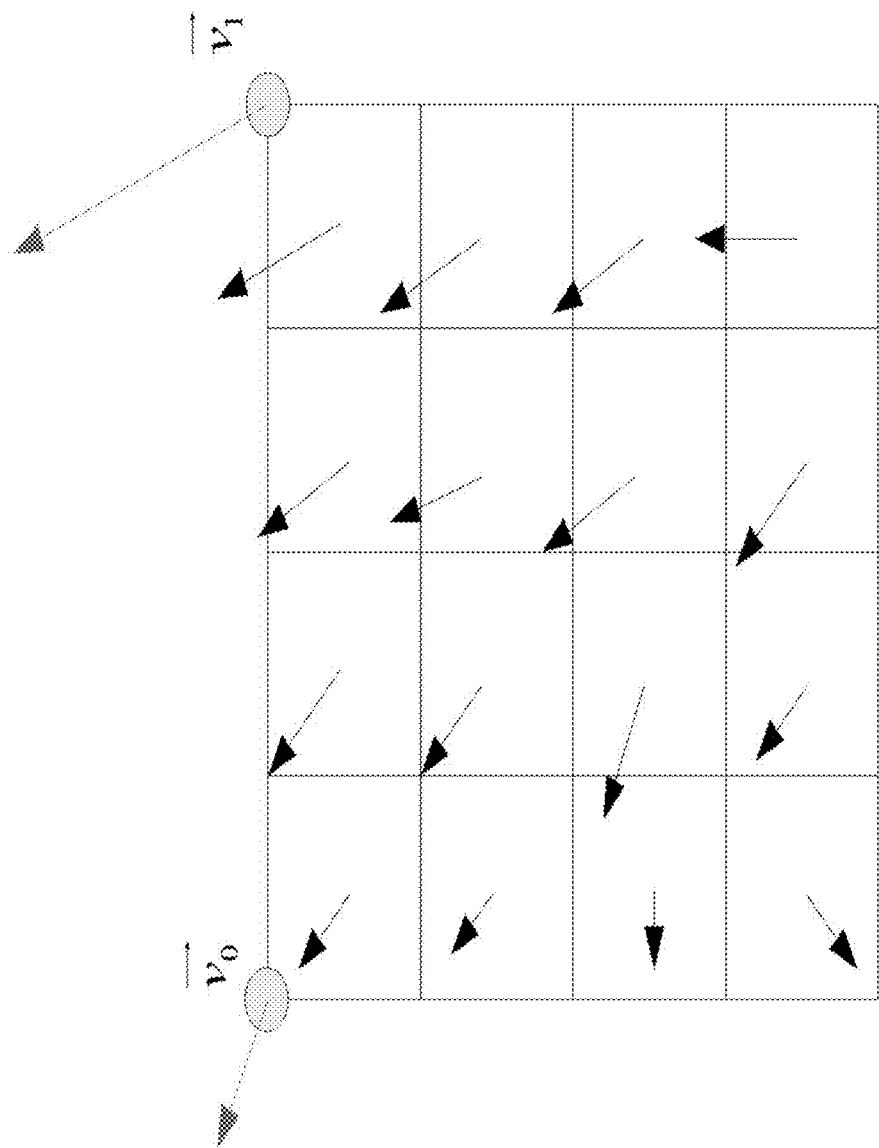
FIG. 3 shows an example of affine motion vector field (MVF) per subblock.

To derive motion vector of each 4×4 sub-block, the motion vector of the center sample of each sub-block, as shown in FIG. 3, is calculated according to Eq. (1) or (2), and rounded to 1/16 fraction accuracy. Then the motion compensation interpolation filters are applied to generate the prediction of each sub-block with derived motion vector.

In VTM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a CP MVP candidate list with two candidates is constructed.

Figure 4A:
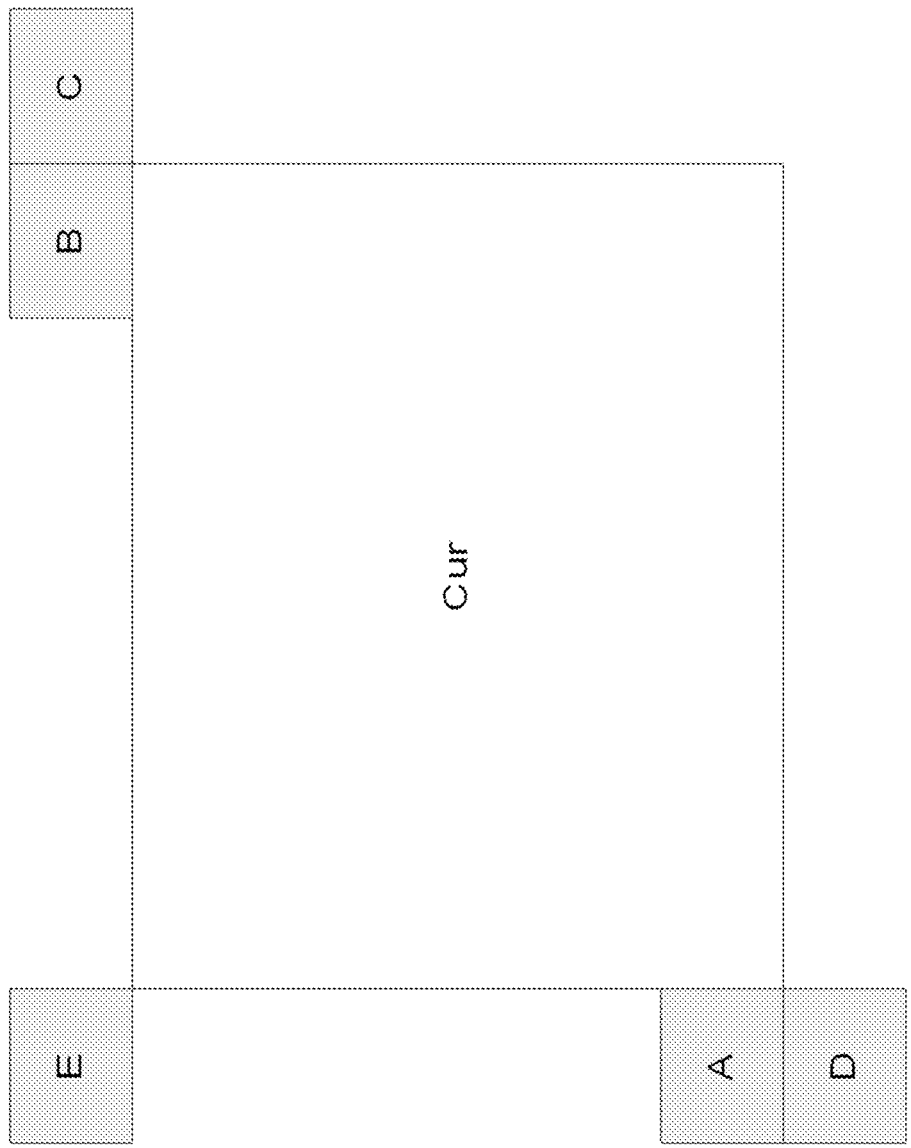
FIGS. 4A-4B show candidates for AF_MERGE mode.
Figure 4B:
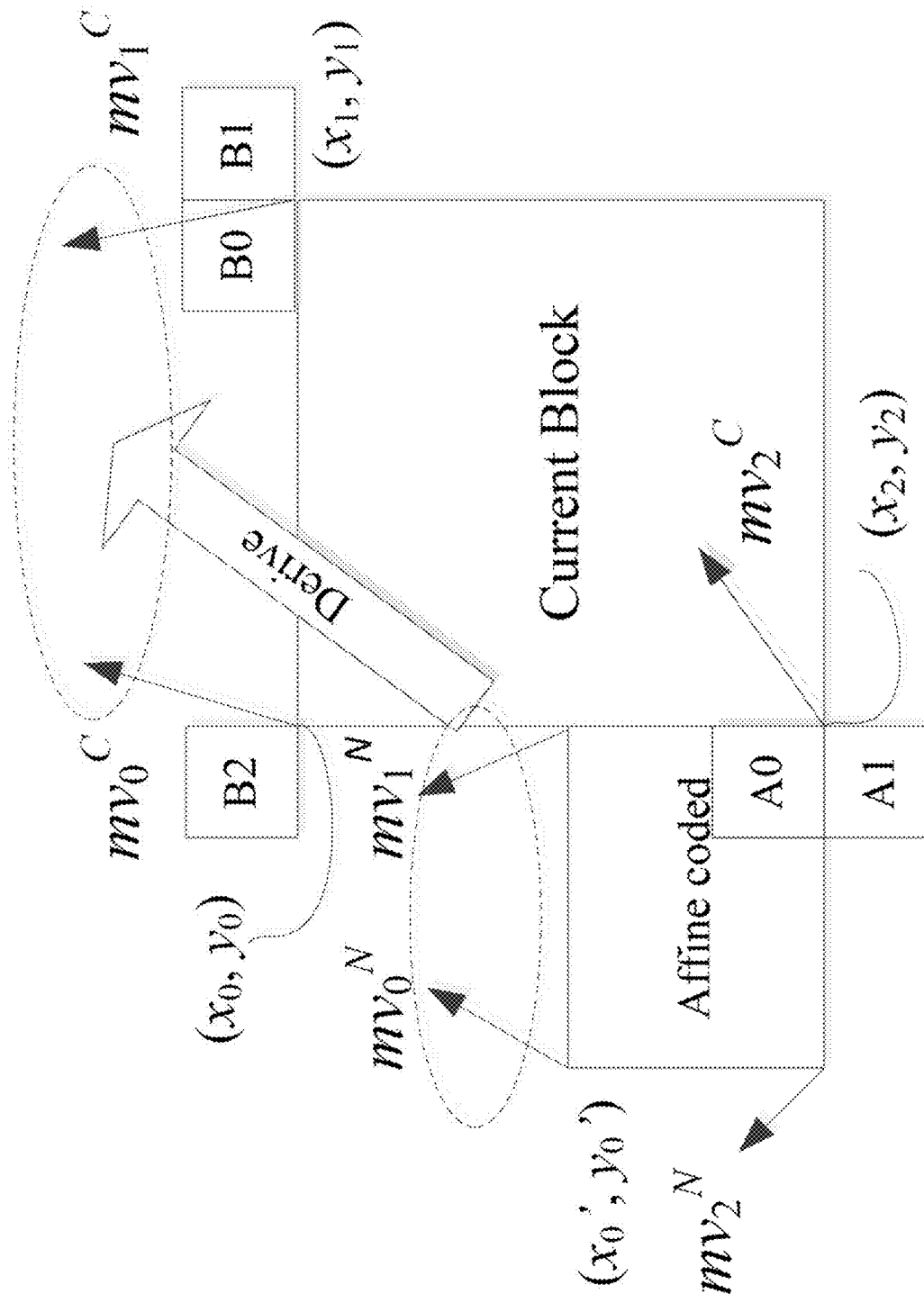

Affine model can be inherited from spatial neighbouring affine-coded block such as left, above, above right, left bottom and above left neighbouring block as shown in FIG. 4A. For example, if the neighbour left block A in FIG. 4A is coded in affine mode as denoted by A0 in FIG. 4B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$.

It should be noted that when a CU is coded with affine merge mode, i.e., in AF_MERGE mode, it gets the first block coded with affine mode from the valid neighbour reconstructed blocks. And the selection order for the candidate block is from left, above, above right, left bottom to above left as shown FIG. 4A.

The derived CP MVs $mv_0^C$, $mv_1^C$ and $mv_2^C$ of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

1.2 JVET-K0186

Different from VTM wherein only one affine spatial neighboring block may be used to derive affine motion for a block, in JVET-K0186, it proposes to construct a separate list of affine candidates for the AF_MERGE mode.

1) Insert Inherited Affine Candidates into Candidate List

Figure 5:
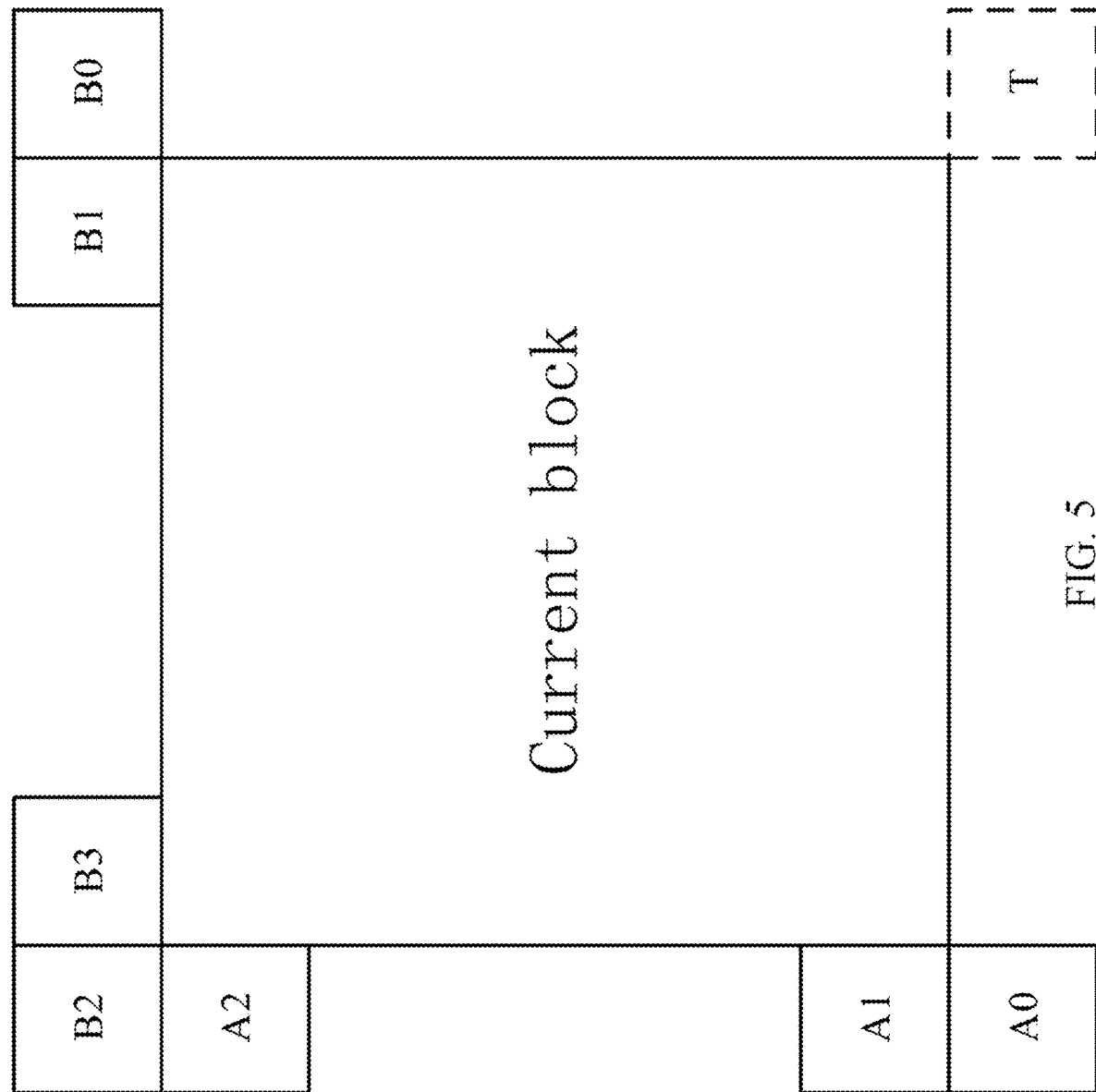
FIG. 5 shows example candidate positions for affine merge mode.

FIG. 5 shows examples of candidate position for affine merge mode.

Inherited affine candidate means that the candidate is derived from the valid neighbor reconstructed block coded with affine mode.

As shown in FIG. 5, the scan order for the candidate block is $A_1$, $B_1$, $B_0$, $A_0$ and $B_2$. When a block is selected (e.g., $A_1$), the two-step procedure is applied:

a) Firstly, use the three corner motion vectors of the CU covering the block to derive two/three control points of current block b) Based on the control points of current block to derive sub-block motion for each sub-block within current block 2) Insert Constructed Affine Candidates If the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if $B_2$ is unavailable, $B_3$ is used. If both $B_2$ and $B_3$ are unavailable, $A_2$ is used. If all the three candidates are unavailable, the motion information of CP1 cannot be obtained.

For CP2, the checking priority is $B1 \rightarrow B0$;

For CP3, the checking priority is $A1 \rightarrow A0$;

For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

3) Insert Zero Motion Vectors

If the number of candidates in affine merge candidate list is less than MaxNumAffineCand, zero motion vectors are insert into the candidate list, until the list is full.

1.3 ATMVP (Advanced Temporal Motion Vector Prediction)

At the 10th JVET meeting, advanced temporal motion vector prediction (ATMVP) was included in the benchmark set (BMS)-1.0 reference software, which derives multiple motion for sub-blocks of one coding unit (CU) based on the motion information of the collocated blocks from temporal neighboring pictures. Although it improves the efficiency of temporal motion vector prediction, the following complexity issues are identified for the existing ATMVP design:

The collocated pictures of different ATMVP CUs may not be the same if multiple reference pictures are used. This means the motion fields of multiple reference pictures need to be fetched.

The motion information of each ATMVP CU is always derived based on 4×4 units, resulting in multiple invocations of motion derivation and motion compensation for each 4×4 sub-block inside one ATMVP CU.

Some further simplifications on ATMVP were proposed and have been adopted in VTM2.0.

1.3.1 Simplified Collocated Block Derivation with One Fixed Collocated Picture

In this method, one simplified design is proposed to use the same collocated picture as in HEVC, which is signaled at the slice header, as the collocated picture for ATMVP derivation. At the block level, if the reference picture of a neighboring block is different from this collocated picture, the MV of the block is scaled using the HEVC temporal MV scaling method, and the scaled MV is used in ATMVP.

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

1.3.2 Adaptive ATMVP Sub-Block Size

In this method, it is proposed to support the slice-level adaptation of the sub-block size for the ATMVP motion derivation. Specifically, one default sub-block size that is used for the ATMVP motion derivation is signaled at sequence level. Additionally, one flag is signaled at slice-level to indicate if the default sub-block size is used for the current slice. If the flag is false, the corresponding ATMVP sub-block size is further signaled in the slice header for the slice.

1.4 STMVP (Spatial-Temporal Motion Vector Prediction)

Figure 6:
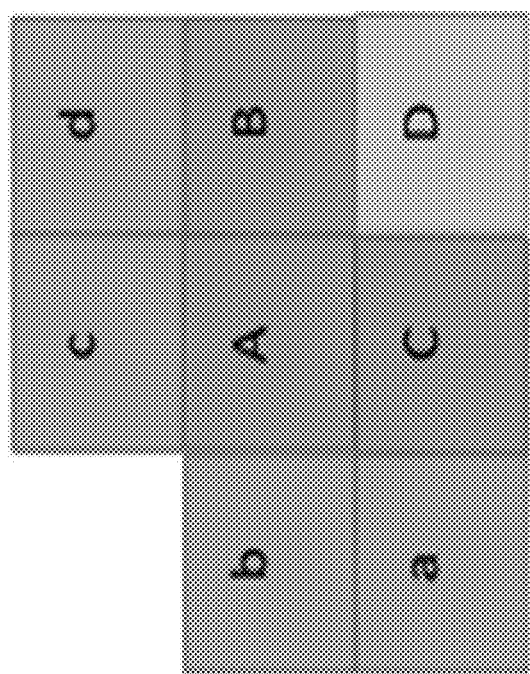
FIG. 6 shows an example of a Coding Unit (CU) with four sub-blocks (A-D) and its neighbouring blocks (a-d).

STMVP was proposed and adopted in JEM, but not in VVC yet. In STMVP, the motion vectors of the sub-CUs are derived recursively, following raster scan order. FIG. 6. illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 6 shows an example of one CU with four sub-blocks (A-D) and its neighbouring blocks (a-d)

2. Problems

The current design of affine mode has the following problems:

1: The decoder must access MVs of 4×4 blocks not adjacent to the current CU such as $mv_0N$ and $mv_2N$ in FIG. 4B. To store those MVs requires additional on-chip memory which increase the chip cost a lot.

2: With the affine merge mode, the CP MVs of the current block is first derived from the CP MVs of the affine-coded neighbouring block, then the MVs of each sub-block is derived from the CP MVs of the current block. This two-step procedure may lose precision of motion vectors.

3: when a separate list is constructed for the affine merge mode, it may include all kinds of sub-block based motion candidates. How to insert them in order is a question to be studied.

4: For the AF_INTER mode, it follows HEVC design for translational motion vector prediction wherein only 2 MVP candidates may be utilized. However, considering AF_INTER mode may involve more bits for MV difference (MVD) signaling, increasing the MVP candidate list size for AF_INTER may bring additional coding gains.

3. Example Techniques

We disclose several methods to reduce the memory required by the affine model inheritance.

The detailed inventions below should be considered as examples to explain general concepts. These inventions should not be interpreted in a narrow way. Furthermore, these inventions can be combined in any manner. Combination between this invention and other invention is also applicable.

Technique 1: Complexity Reduction

Suppose one frame is split into multiple non-overlapped M×N (e.g., a CTU size) regions. The top-left coordinate of the M×N region containing the current block is denoted as (x, y).

Figure 7:
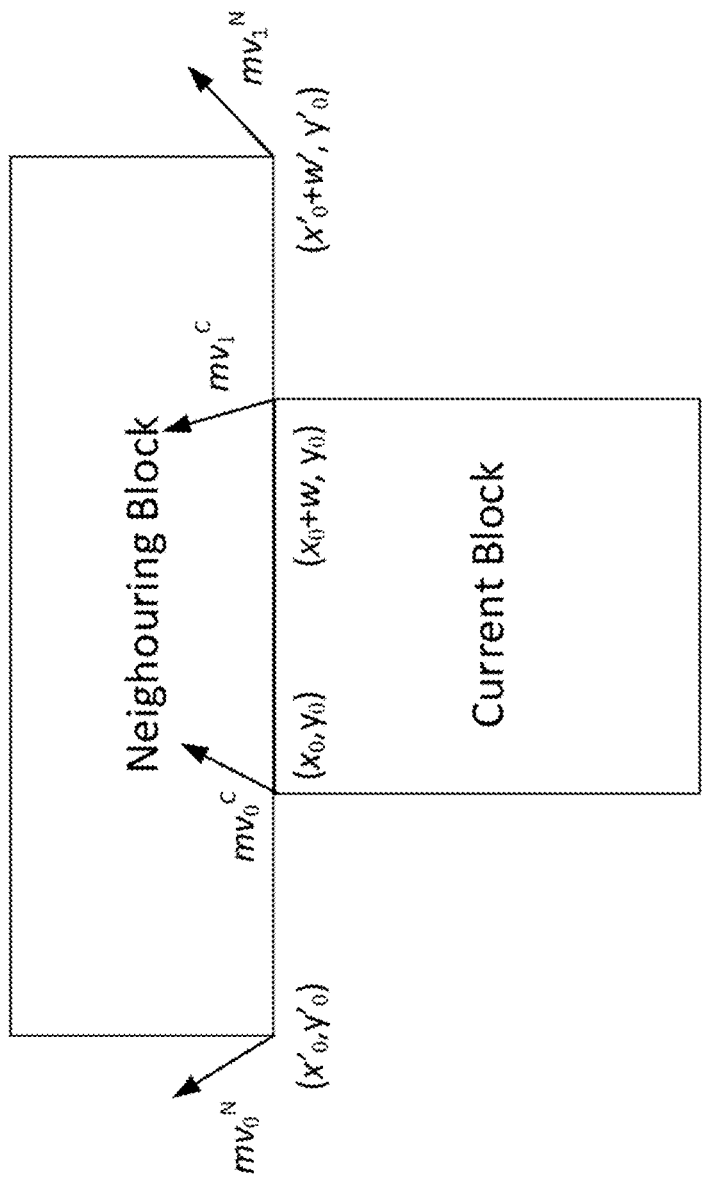
FIG. 7 Affine inheritance by deriving from the two bottom CPs of a neighbouring block.
Figure 8:
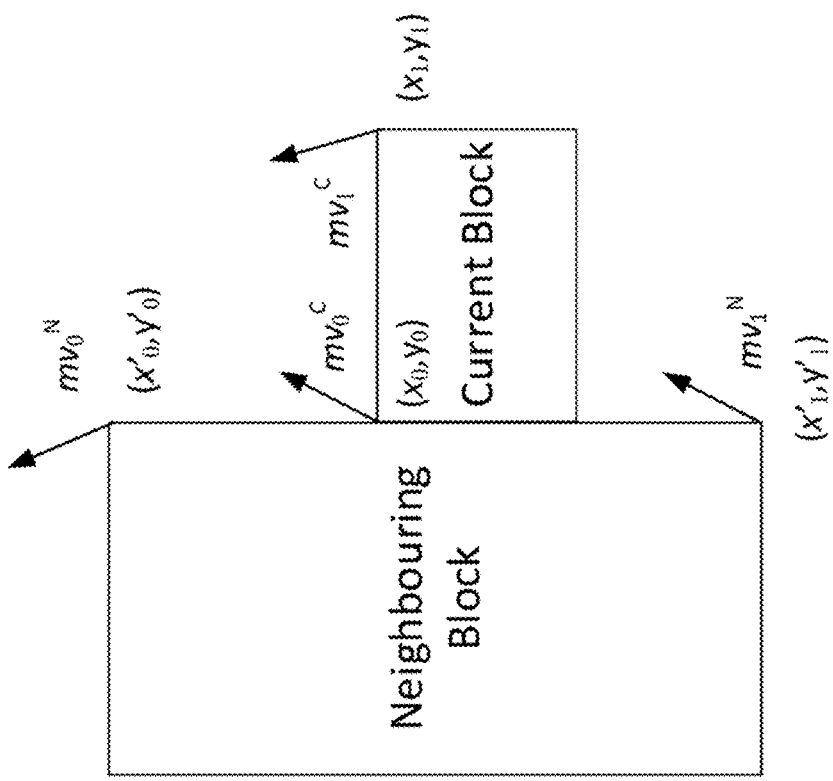
FIG. 8 Affine inheritance by deriving from the two right CPs of a neighbouring block

1. In one example, whether to and how to inherit the affine model (i.e., using its affine motion for derivation of current block' motion) from a neighbouring block (a CU or PU) depends on the location relationship of the current block and the neighbouring block and/or affine models (such as 4-parameter or 6-parameter affine model).
  a. For example, whether to and how to inherit the affine model from a neighbouring block depends on whether the whole neighboring block and the current block in a same M×N region, such as a 128×128 region, a 64×64 region or a 32×32 region.
    i. Alternatively, if current block is coded with 4-parameter affine model, whether to and how to inherit the affine model from a neighbouring block depends on whether the top row of the neighboring block and the current block in a same M×N region, such as a 128×128 region, a 64×64 region or a 32×32 region.
    ii. Alternatively, if current block is coded with 6-parameter affine model, whether to and how to inherit the affine model from a neighbouring block depends on whether the whole neighboring block and the current block in a same M×N region, such as a 128×128 region, a 64×64 region or a 32×32 region.
    iii. For example, affine model cannot be inherited from a neighbouring block if it is not in the same M×N region as the current block.
    iv. For example, affine model can be inherited from a neighbouring block in the way as described in VVC, if it is in the same M×N region as the current block.
    v. For example, affine model can be inherited from a neighbouring block in a way different from that in VVC, if it is not in the same M×N region as the current block.
  b. For example, whether to and how to inherit the affine model from a neighbouring block depends on whether the neighboring block is left to the current block, or is above to the current block, or is above-right to the current block, or is bottom-left to the current block, or is above-left to the current block. In other words, whether to and how to inherit the affine model from a neighbouring block depends on which of "A", "B", "C", "D" and "E" in FIG. 4A the neighbouring block comes from.
    i. For example, the affine model is inherited from a neighbouring block coming from "B", "C" and "E" in FIG. 4A with one method; and the affine model is inherited from a neighbouring block coming from "A" and "D" in FIG. 4A with another method.
    ii. For example, the affine model is inherited from a neighbouring block coming from "B" and "C" in FIG. 4A with one method; and the affine model is inherited from a neighbouring block coming from "A", "D" and "E" in FIG. 4A with another method.
    iii. The top-left coordinate of the M×N region containing the neighbouring block coming from "E" in FIG. 4A is denoted as (x', y'). Then the affine model cannot be inherited from the neighbouring block coming from "E" if x is not equal to x'.
    iv. The top-left coordinate of the M×N region containing the neighbouring block coming from "C" in FIG. 4A is denoted as (x', y'). Then the affine model cannot be inherited from the neighbouring block coming from "C" if x is not equal to x'.
    v. The top-left coordinate of the M×N region containing the neighbouring block coming from "D" in FIG. 4A is denoted as (x', y'). Then the affine model cannot be inherited from the neighbouring block coming from "D" if y is not equal to y'.
2. The affine model inheritance can be conducted by deriving the CP MVs of the current block from the bottom-left MV and bottom-right MV of the affine-coded neighbouring block as shown in FIG. 7.
  a. In one example, $mv_0^C=(mv_0^{Ch}, mv_0^{Cv})$ and $mv_1^C=(mv_1^{Ch}, mv_1^{Cv})$ are derived from $mv_0^N=(mv_0^{Nh}, mv_0^{Nv})$ and $mv_1^{Nh}=(mv_1^{Nv})$ as:

$$\begin{cases} a = \dfrac{(mv_1^{Nh} - mv_0^{Nh})}{w'} \\ b = \dfrac{(mv_1^{Nv} - mv_0^{Nv})}{w'} \end{cases} \quad (3)$$

$$\begin{cases} mv_0^{Ch} = a(x_0 - x_0') - b(y_0 - y_0') + mv_0^{Nh} \\ mv_0^{Cv} = b(x_0 - x_0') + a(y_0 - y_0') + mv_0^{Nv} \end{cases}$$

$$\begin{cases} mv_1^{Ch} = a(x_0 + w - x_0') - b(y_0 - y_0') + mv_0^{Nh} \\ mv_1^{Cv} = b(x_0 + w - x_0') + a(y_0 - y_0') + mv_0^{Nv} \end{cases}$$

where w and w' are the width of the current block and the width of the neighbouring block, respectively. $(x_0, y_0)$ is the coordinate of the top-left corner of the current block and $(x'_0, y'_0)$ is the coordinate of the bottom-left corner of the neighbouring block.
  Alternatively, furthermore, the division operation in a and b calculation process could be replaced by shift with or without adding operations.
  b. For example, the affine model inheritance is conducted by deriving the CP MVs of the current block from the bottom-left MV and bottom-right MV of the affine-coded neighbouring block coming from "B" and "C" in FIG. 4A.
    i. Alternatively, the affine model inheritance is conducted by deriving the CP MVs of the current block from the bottom-left MV and bottom-right MV of the affine-coded neighbouring block coming from "B", "C" and "E" in FIG. 4A.
  c. For example, the affine model inheritance is conducted by deriving the CP MVs of the current block from the bottom-left MV and bottom-right MV of the affine-coded neighbouring block only if the neighbouring block is in a M×N region that is above (or above-right, or above-left) to the M×N region containing the current block.
  d. For example, $y_0=y'_0$.
    i. Alternatively, $y_0=1+y'_0$.
  e. For example, if the current block inherits affine model by deriving the CP MVs of the current block from the bottom-left MV and bottom-right MV of the affine-coded neighbouring block, then the current block is regarded as using the 4-parameter affine model. FIG. 7 Affine inheritance by deriving from the two bottom CPs of a neighbouring block.
3. The affine model inheritance can be conducted by deriving the CP MVs of the current block from the top-right MV and bottom-right MV of the affine-coded neighbouring block as shown in FIG. 8.
  a. For example, $mv_0^C=(mv_0^{Ch}, mv_0^{Cv})$ and $mv_1^C=(mv_1Ch, mv_1^{Cv})$ are derived from $mv_0^N=(mv_0^{Nh}, mv_0^{Nv})$ and $mv_1^N=(mv_1Nh, mv_1Nr)$ as:

$$\begin{cases} a = \dfrac{(mv_1^{Nv} - mv_0^{Nv})}{h'} \\ b = -\dfrac{(mv_1^{Nh} - mv_0^{Nh})}{h'} \end{cases} \quad (4)$$

$$\begin{cases} mv_0^{Ch} = a(x_0 - x_0') - b(y_0 - y_0') + mv_0^{Nh} \\ mv_0^{Cv} = b(x_0 - x_0') + a(y_0 - y_0') + mv_0^{Nv} \end{cases}$$

$$\begin{cases} mv_1^{Ch} = a(x_0 + w - x_0') - b(y_0 - y_0') + mv_0^{Nh} \\ mv_1^{Cv} = b(x_0 + w - x_0') + a(y_0 - y_0') + mv_0^{Nv} \end{cases}$$

where h' is the height of the neighbouring block. w is the width of the current block.

($x_0$, $y_0$) is the coordinate of the top-left corner of the current block and ($x'_0$, $y'_0$) is the coordinate of the top-right corner of the neighbouring block.

Alternatively, furthermore, the division operation in a and b calculation process could be replaced by shift with or without adding operations.

b. For example, the affine model inheritance is conducted by deriving the CP MVs of the current block from the top-right MV and bottom-right MV of the affine-coded neighbouring block coming from "A" and "D" in FIG. 4A.

i. Alternatively, the affine model inheritance is conducted by deriving the CP MVs of the current block from the top-right MV and bottom-right MV of the affine-coded neighbouring block coming from "A", "D" and "E" in FIG. 4A.

c. For example, the affine model inheritance is conducted by deriving the CP MVs of the current block from the top-right MV and bottom-right MV of the affine-coded neighbouring block only if the neighbouring block is in a M×N region that is left (or above-left, or bottom-left) to the M×N region containing the current block.

d. For example, $x_0 = x'_0$.

i. Alternatively, $x_0 = 1 + x'_0$.

e. For example, if the current block inherits affine model by deriving the CP MVs of the current block from the top-right MV and bottom-right MV of the affine-coded neighbouring block, then the current block is regarded as using the 4-parameter affine model.

Technique 2: Motion Vector Derivation for Sub-Block in Affine Mode

4. More CP MVs may be derived and stored for motion vector prediction and/or filtering process if the current block does not use the 6-parameter affine model.

a. In one example, the stored left-bottom MV can be used in motion prediction including affine model inheritance for following coded PU/CUs.

b. In one example, the stored left-bottom MV can be used in motion prediction of succeeding pictures.

c. In one example, the stored left-bottom MV can be used in the deblocking filtering process.

d. If an affine coded block does not use the 6-parameter affine model, the CP MV of the left-bottom corner is derived for the affine coded block and is stored in the left-bottom MV unit, which is 4×4 in VVC.

i. The CP MV (noted as $mv_2 = (mv_2^h, mv_2^v)$) of the left-bottom corner is derived for the 4-parameter affine model as $$\begin{cases} mv_2^h = \dfrac{(mv_1^v - mv_0^v)}{w}h + mv_0^h \\ mv_2^v = \dfrac{(mv_1^h - mv_0^h)}{w}h + mv_0^v \end{cases} \quad (5)$$

e. The CP MV of the right-bottom corner is derived for an affine coded block and is stored in the right-bottom MV unit, which is 4×4 in VVC. The stored right-bottom MV can be used in motion prediction including affine model inheritance for following coded PU/CUs, or motion prediction of succeeding pictures or deblocking filtering process.

i. The CP MV (noted as $mv_3 = (mv_3^h, mv_3^v)$) of the right-bottom corner is derived for the 4-parameter affine model as $$\begin{cases} mv_3^h = mv_1^h - \dfrac{(mv_1^v - mv_0^v)}{w}h \\ mv_3^v = mv_1^v + \dfrac{(mv_1^h - mv_0^h)}{w}h \end{cases} \quad (6)$$

ii. The CP MV of the right-bottom corner is derived for the 6-parameter affine model as $$\begin{cases} mv_3^h = mv_1^h + mv_2^h - mv_0^h \\ mv_3^v = mv_1^v + mv_2^v - mv_0^v \end{cases} \quad (7)$$

iii. The CP MV of the right-bottom corner is derived for both the 4-parameter affine model and the 6-parameter affine model as $$a. \begin{cases} mv_3^h = mv_1^h + mv_2^h - mv_0^h \\ mv_3^v = mv_1^v + mv_2^v - mv_0^v \end{cases} \quad (8)$$

b. if $mv_2 = (mv_2^h, mv_2^v)$ in the 4-parameter model is calculated as (5). FIG. 8 Affine inheritance by deriving from the two right CPs of a neighbouring block.

5. For example, the MVs of each sub-block are derived directly from the CP MVs of the neighbouring block when the current block is coded with the affine merge mode, instead of with the two-step procedure.

a. In one example, the MV of a sub-block denoted as ($mv^h(x, y)$, $mv^v(x, y)$), where (x, y) is the coordinate of the center of the sub-block, is derived as $$\begin{cases} mv^h(x, y) = \dfrac{(mv_1^h - mv_0^h)}{w}(x - x_0) - \dfrac{(mv_1^v - mv_0^v)}{w}(y - y_0) + mv_0^h \\ mv^v(x, y) = \dfrac{(mv_1^v - mv_0^v)}{w}(x - x_0) + \dfrac{(mv_1^h - mv_0^h)}{w}(y - y_0) + mv_0^v \end{cases}$$

if the neighbouring block is coded with the 4-parameter affine model.

And $$\begin{cases} mv^h(x, y) = \frac{(mv_1^h - mv_0^h)}{w}(x - x_0) + \frac{(mv_2^h - mv_0^h)}{h}(y - y_0) + mv_0^h \\ mv^v(x, y) = \frac{(mv_1^v - mv_0^v)}{w}(x - x_0) + \frac{(mv_2^v - mv_0^v)}{h}(y - y_0) + mv_0^v \end{cases}$$

if the neighbouring block is coded with the 6-parameter affine model.

($mv^h_0$, $mv^v_0$) is motion vector of the top-left corner control point of the neighbouring block, ($mv^h_1$, $mv^v_1$) is motion vector of the top-right corner control point of the neighbouring block and ($mv^h_2$, $mv^v_2$) is motion vector of the bottom-left corner control point of the neighbouring block. w and h are the width and height of the neighbouring block. ($x_0$, $y_0$) is the coordinate of the top-left corner of the neighbouring block.

b. In one example, the MV of a sub-block denoted as ($mv^h(x, y)$, $mv^v(x, y)$), where (x, y) is the coordinate of the center of the sub-block, is derived as $$\begin{cases} a = \frac{(mv_1^h - mv_0^h)}{w} \\ b = \frac{(mv_1^v - mv_0^v)}{w} \end{cases}$$

$$\begin{cases} mv^h(x, y) = a(x_0 - x_0) - b(y_0 - y_0) + mv_0^h \\ mv^v(x, y) = b(x_0 - x_0) + a(y_0 - y_0) + mv_0^v \end{cases}$$

if the affine model inheritance is conducted according to the bottom-left MV and bottom-right MV of the affine-coded neighbouring block as shown in FIG. 7.

($mv^h_0$, $mv^v_0$) is motion vector of the bottom-left corner control point of the neighbouring block, ($mv^h_1$, $mv^h_1$) is motion vector of the bottom-right corner control point of the neighbouring block. w and h are the width and height of the neighbouring block. ($x_0$, $y_0$) is the coordinate of the bottom-left corner of the neighbouring block.

c. In one example, the MV of a sub-block denoted as ($mv^v(x, y)$, $mv^h(x, y)$), where (x, y) is the coordinate of the center of the sub-block, is derived as $$\begin{cases} a = \frac{(mv_1^v - mv_0^v)}{h} \\ b = -\frac{(mv_1^h - mv_0^h)}{h} \end{cases}$$

$$\begin{cases} mv^h(x, y) = a(x_0 - x_0) - b(y_0 - y_0) + mv_0^h \\ mv^v(x, y) = b(x_0 - x_0) + a(y_0 - y_0) + mv_0^v \end{cases}$$

if the affine model inheritance is conducted according to the top-right MV and bottom-right MV of the affine-coded neighbouring block as shown in FIG. 8.

($mv^h_0$, $mv^v_0$) is motion vector of the top-right corner control point of the neighbouring block, ($mv^h_1$, $mv^v_1$) is motion vector of the bottom-right corner control point of the neighbouring block. w and h are the width and height of the neighbouring block. ($x_0$, $y_0$) is the coordinate of the top-right corner of the neighbouring block.

Technique 3: Construction for Sub-Block Motion Candidate List

6. When multiple types of sub-block motion candidates (e.g., ATMVP, STMVP, inherited affine candidates, constructed affine candidates) may be added to one candidate list, the inserting order may be adaptively changed.
   a. In one example, the inserting order may be dependent on the coded information of current/neighboring blocks.
      i. In one example, the order may depend on whether any of the neighboring blocks used for candidate list construction process is coded with affine mode.
      ii. In one example, the order may depend on how many of the neighboring blocks used for candidate list construction process are coded with affine mode.
   b. In one example, the inserting order is inherited affine candidates, ATMVP, STMVP, constructed affine candidates, and others. Such an order may be utilized when there are more than K (e.g., K>=1) spatial neighboring blocks coded with affine mode.
   c. In one example, the inserting order is inherited affine candidates, constructed affine candidates, ATMVP, STMVP, and others. Such an order may be utilized when there are more than K (e.g., K>=1) spatial neighboring blocks coded with affine mode.
   d. In one example, the inserting order is ATMVP, STMVP, constructed affine candidates, and others. Such an order may be utilized when there is no affine mode associated with those spatial neighboring blocks.
7. In one example, constructed affine candidates can only include CPMVs referring to the same reference picture. No scaling is applied to construct affine candidates.
8. Pruning procedure can be involved in the construction of the sub-block motion candidates. An affine merge candidate is not inserted into the sub-block motion candidate if there is another affine merge candidate in the list is regarded as "identical" to it. The comparison process of two motion candidates is called pruning process. Suppose the three CPMVs at top-left, top-right and bottom-left corners of one candidate are MV0=(MVx0, MVy0), MV1=(MVx1, MVy1), MV2=(MVx2, MVy2); the three CPMVs at top-left, top-right and bottom-left corners of another candidate are MV'0-(MV'x0, MV'y0), MV'1=(MV'x1, MV'y1), MV'2=(MV'x2, MV'y2).
   a. In one example, two affine merge candidates are judged whether identical by comparing their CPMVs. The two candidates are considered as "identical" if
      i. MVx0==MV'x0 and MVy0==MV'y0 and MVx1==MV'x1 and MVy1==MV'y1;
      ii. MVx0==MV'x0 and MVy0==MV'y0 and MVx1==MV'x1 and MVy1==MV'y1 and MVx2==MV'x2 and MVy2==MV'y2;
      iii. |MVx0−MV'x0|<D and |MVy0−MV'y0|<E and |MVx1−MV'x1|<D and |MVy1−MV'y1|<E;
      iv. |MVx0−MV'x0|<D and |MVy0−MV'y0|<E and |MVx1−MV'x1|<D and |MVy1−MV'y1|<E and |MVx2−MV'x2|<D and |MVy2−MV'y2|<E
      v. D may be equal to E.
      vi. In one example, thresholds D and/or E is a fixed number such as 1 or 4;

vii. In another example, thresholds D and/or E is adaptive.
   1. For example, D and/or E depends on the size of the current block.
   2. In one example, when the width and/or height is larger, D and/or E is larger. In another example, when the width and/or height is larger, D and/or E is smaller.
   3. Alternatively, furthermore, different thresholds may be used for different MV difference comparisons.
b. In one example, two affine merge candidates are judged whether identical by comparing CPMVs and the difference of CPMVs. Suppose Diffx1=MVx1−MVx0, Diffy1=MVy1−MVy0, Diffx2=MVx2−MVx0, Diffy2=MVy2−MVy0, Diff'x1=MV'x1−MV'x0, Diff'y1=MV'y1−MV'y0, Diff'x2=MV'x2−MV'x0, Diff'y2=MV'y2−MV'y0. The two candidates are considered as "identical" if
   i. MVx0==MV'x0 and MVy0==MV'y0 and Diffx1==Diff'x1 and Diffy1==Diff'y1;
   ii. MVx0==MV'x0 and MVy0==MV'y0 and Diffx1==Diff'x1 and Diffy1==Diff'y1 and Diffx2==Diff'x2 and Diffy2==Diff'y2;
   iii. |MVx0−MV'x0|<D and |MVy0−MV'y0|<E and |Diffx1−Diff'x1|<F and |Diffy1−Diff'y1|<G;
   iv. |MVx0−MV'x0|<D and |MVy0−MV'y0|<E and |Diffx1−Diff'x1|<F and |Diffy1−Diff'y1|<G and |Diffx2−Diff'x2|<F and |Diffy2−Diff'y2|<G;
   v. D may be equal to E. F may be equal to G.
   vi. In one example, thresholds D or E or F or G is a fixed number such as 1 or 4;
   vii. In another example, thresholds D and/or E and/or F and/or G are adaptive.
      1. For example, D and/or E depends on the size of the current block.
      2. In one example, when the width and/or height is larger, D and/or E is larger. In another example, when the width and/or height is larger, D and/or E is smaller.
      3. For example, F and/or G depends on the size of the current block.
      4. In one example, when the width and/or height is larger, F and/or G is larger. In another example, when the width and/or height is larger, F and/or G is smaller.
   viii. Alternatively, furthermore, different thresholds may be used for different MV difference comparisons.
c. Alternatively, the pruning process may further depend on the affine motion model, e.g., 4-parameter or 6-parameter.
   i. In one example, for 4-parameter, bullet a.i. or bullet a.iii. or bullet b.i. or bullet b.iii may be applied.
   ii. In one example, for 6-parameter, bullet a.ii. or bullet a.iv. or bullet b.ii. or bullet b.iv. may be applied.
9. When multiple types of sub-block motion candidates (e.g., ATMVP, STMVP, inherited affine candidates, constructed affine candidates) may be added to one candidate list, each index to the candidate list may correspond to one specific type.
   a. In one example, index equal to S (S>=0) may always correspond to an ATMVP candidate.
   b. In one example, index equal to P (P>=0) may always correspond to an ATMVP candidate.
   c. In one example, index equal to Q (Q>=0) may always correspond to an affine candidate.
   d. Integers S/P/Q may be signaled from the encoder to the decoder in SPS/PPS/slice header/CTU/CU.
   e. Integers S/P/Q may depend on the current block size, the block sizes of the spatial/temporal neighbouring blocks, and the coding modes of the spatial/temporal neighbouring blocks.
10. When the merge list is not full after inserting several candidates like ATMVP, STMVP, inherited affine candidates, new sub-block motion candidates may be further added and how to add them may depend on coded information and/or number of available motion candidates in the merge list so far.
   a. In one example, when inherited affine candidates are available in the merge list, constructed affine candidates may be added.
   b. In one example, when inherited affine candidates are not available in the merge list, more ATMVP and/or STMVP candidates may be inserted.

Technique 4: Affine inter mode MVP candidate list
11. The size of MVP candidate list of affine inter mode and non-affine inter mode may be different.
   a. In one example, the size of MVP candidate list of affine inter mode is larger than that of non-affine inter mode. For example, the size of MVP candidate list of affine inter mode is 3 or 4, but the size of MVP candidate list of non-affine inter mode is 2.
   b. In one example, the size of MVP candidate list of affine inter mode may be adaptive.
      i. For example, the size of MVP candidate list of affine inter mode depends on the number of affine coded neighbouring blocks. The size is larger when there are more affine coded neighbouring blocks.

4. Embodiment Examples

This section discloses an example of embodiment of the proposed technique. It should be noted that it is only one of the all possible embodiments of the proposed methods and should not be understood in a narrow way.
Input:
The coordinate of top-left corner of the current block noted as (posCurX, posCurY);
The coordinate of top-left corner of the neighbouring block noted as (posLTX, posLTY);
The coordinate of top-right corner of the neighbouring block noted as (posRTX, posRTY);
The coordinate of bottom-left corner of the neighbouring block noted as (posLBX, posLBY);
The coordinate of bottom-right corner of the neighbouring block noted as (posRBX, posRBY);
The width and height of the current block noted as W and H;
The width and height of the neighbouring block noted as W' and H';
The MV at top-left corner of the neighbouring block noted as (mvLTX, mvLTY);
The MV at top-right corner of the neighbouring block noted as (mvRTX, mvRTY);
The MV at bottom-left corner of the neighbouring block noted as (mvLBX, mvLBY);
The MV at bottom-right corner of the neighbouring block noted as (mvRBX, mvRBY);
A constant number: shift, which can be any positive integer such as 7 or 8.

Output:
The MV at top-left corner of the current block noted as (MV0X, MV0Y);
The MV at top-right corner of the current block noted as (MV1X, MV1Y);
Procedure of affine model inheritance:
(posCurX64, posCurY64)=(posCurX>>6, posCurY>>6);
(posLTX64, posLTY64)=(posLTX>>6, posLTY>>6);
If posCurX64 is not equal to posLTX64 or posCurY64 is not equal to posLTY64 {
  If posRBY is equal to (posCurY-1) {
    iDMvHorX=(mvRBX-mvLBX)<<(shift-log 2(W'))
    iDMvHorY=(mvRBY-mvLBY)<<(shift-log 2(W'))
    iDMvVerX=-iDMvHorY;
    iDMvVerY=iDMvHorX;
    iMvScaleHor=mvLBX<<shift;
    iMvScale Ver=mvLBY<<shift;
    posNeiX=posLBX;
    posNeiY=posLBY+1;
  }
  else if posRBX is equal to (posCurX-1) {
    iDMvHorX=(mvRBY-mvRTY)<<(shift-log 2(H'))
    iDMvHorY=-(mvRBX-mvRTX)<<(shift-log 2(H'))
    iDMvVerX=-iDMvHorY;
    iDMvVerY=iDMvHorX;
    iMvScaleHor=mvRTX<<shift;
    iMvScale Ver=mvRTY<<shift;
    posNeiX=posLBX+1;
    posNeiY=posLBY;
  }
  else{
  Return "Input is invalid!"
  }
}
else{
  iDMvHorX=(mvRTX-mvLTX)<<(shift-log 2(W'))
  iDMvHorY=(mvRRY-mvLTY)<<(shift-log 2(W'))
  if neighbour block uses 6-parameter affine model
    iDMvVerX=(mvLBX-mvLTX)<<(shift-log 2(H'));
    iDMvVerY=(mvLBY-mvLTY)<<(shift-log 2(H'));
  else
    iDMvVerX=-iDMvHorY;
  iDMvVerY=iDMvHorX;
  iMvScaleHor=mvLTX<<shift;
  iMvScale Ver=mvLTY<<shift;
  posNeiX=posLT;
  posNeiY=posLT;
}
horTmp0=iMvScaleHor+iDMvHorX*(posCurX-posNeiX)+iDMvVerX*(posCurY-posNeiY);
verTmp0=iMvScale Ver+iDMvHorY*(posCurX-posNeiX)+iDMvVerY*(posCurY-posNeiY);
MV0X=roundAffineMv(horTmp0, shift);
MV0Y=roundAffineMv(verTmp0, shift);
horTmp1=iMvScaleHor+iDMvHorX*(posCurX+W-posNeiX)+iDMvVerX*(posCurY-posNeiY);
verTmp1=iMvScale Ver+iDMvHorY*(posCurX+W-posNeiX)+iDMvVerY*(posCurY-posNeiY);
MV1X=roundAffineMv(horTmp1, shift);
MV1Y=roundAffineMv(verTmp1, shift);
The procedure roundAffineMv(X, shift) is defined as
If X>=0, it returns (X+(1<<(shift-1)))>>shift;
Otherwise, it returns -((-X++(1<<(shift-1)))>>shift).

Figure 9:
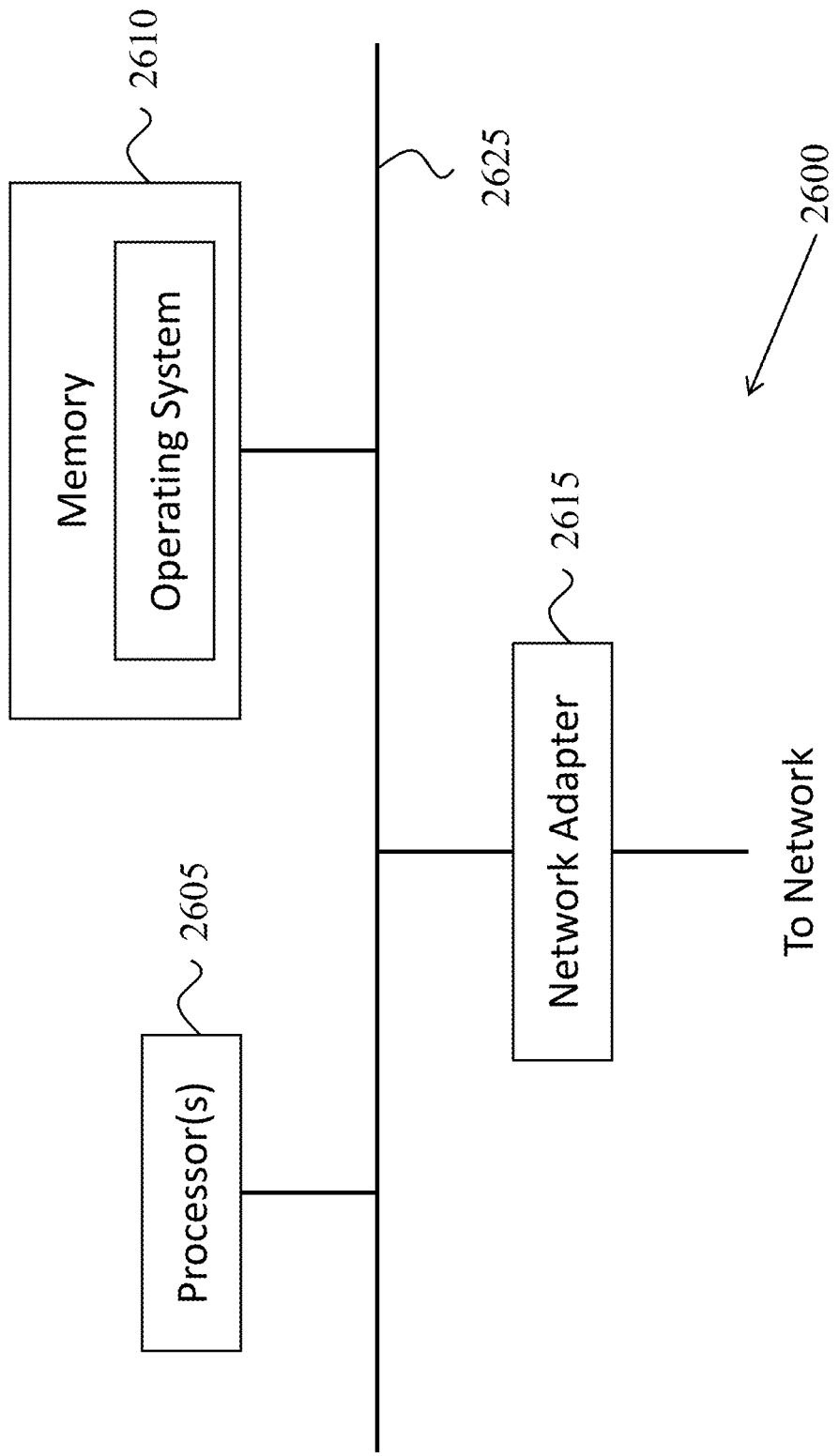
FIG. 9 is a block diagram illustrating an example of the architecture for a computer system or other control device that can be utilized to implement various portions of the presently disclosed technology.

FIG. 9 is a block diagram illustrating an example of the architecture for a computer system or other control device 2600 that can be utilized to implement various portions of the presently disclosed technology. In FIG. 9, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 10:
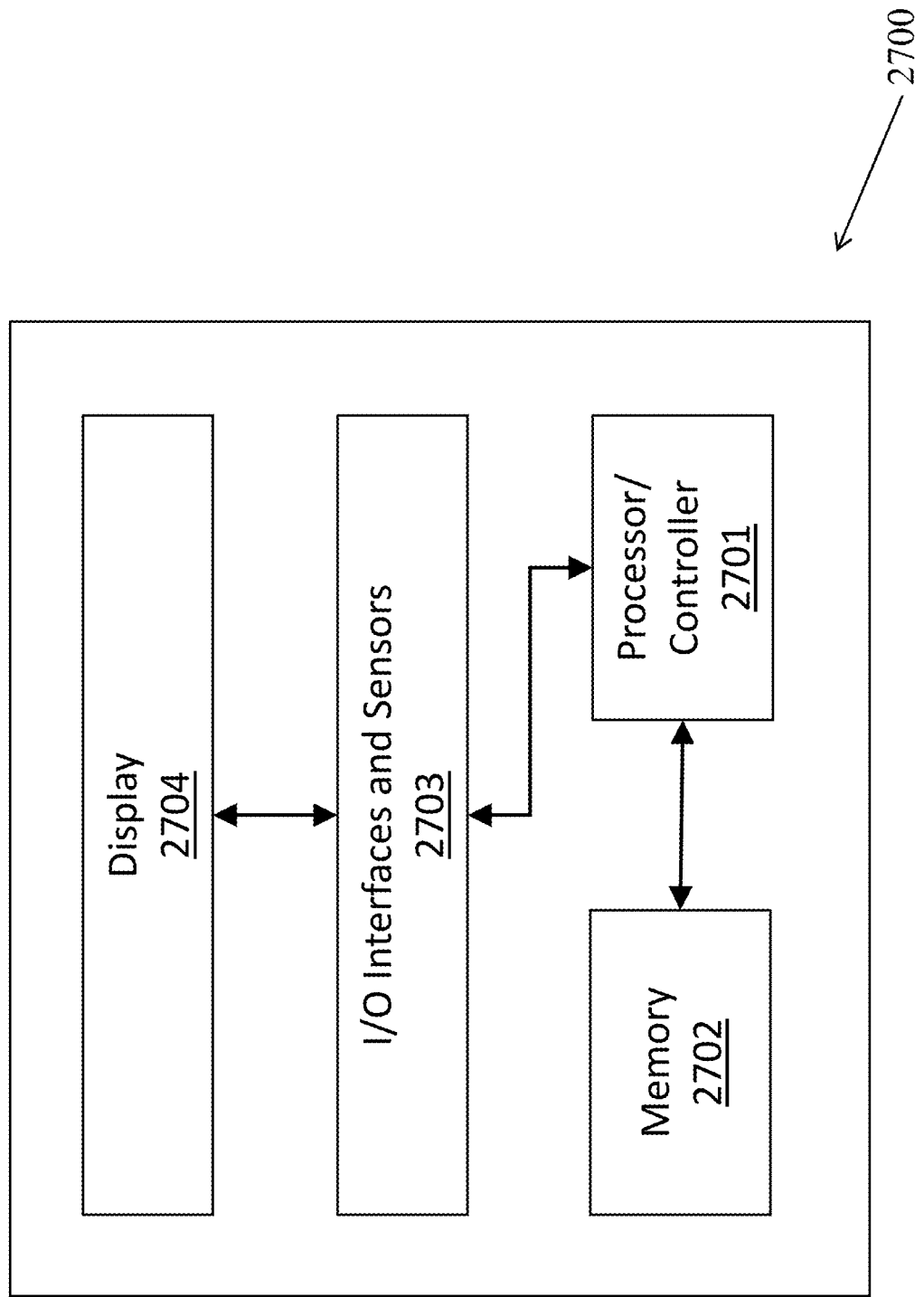
FIG. 10 shows a block diagram of an example embodiment of a mobile device that can be utilized to implement various portions of the presently disclosed technology.

FIG. 10 shows a block diagram of an example embodiment of a mobile device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

Figure 11:
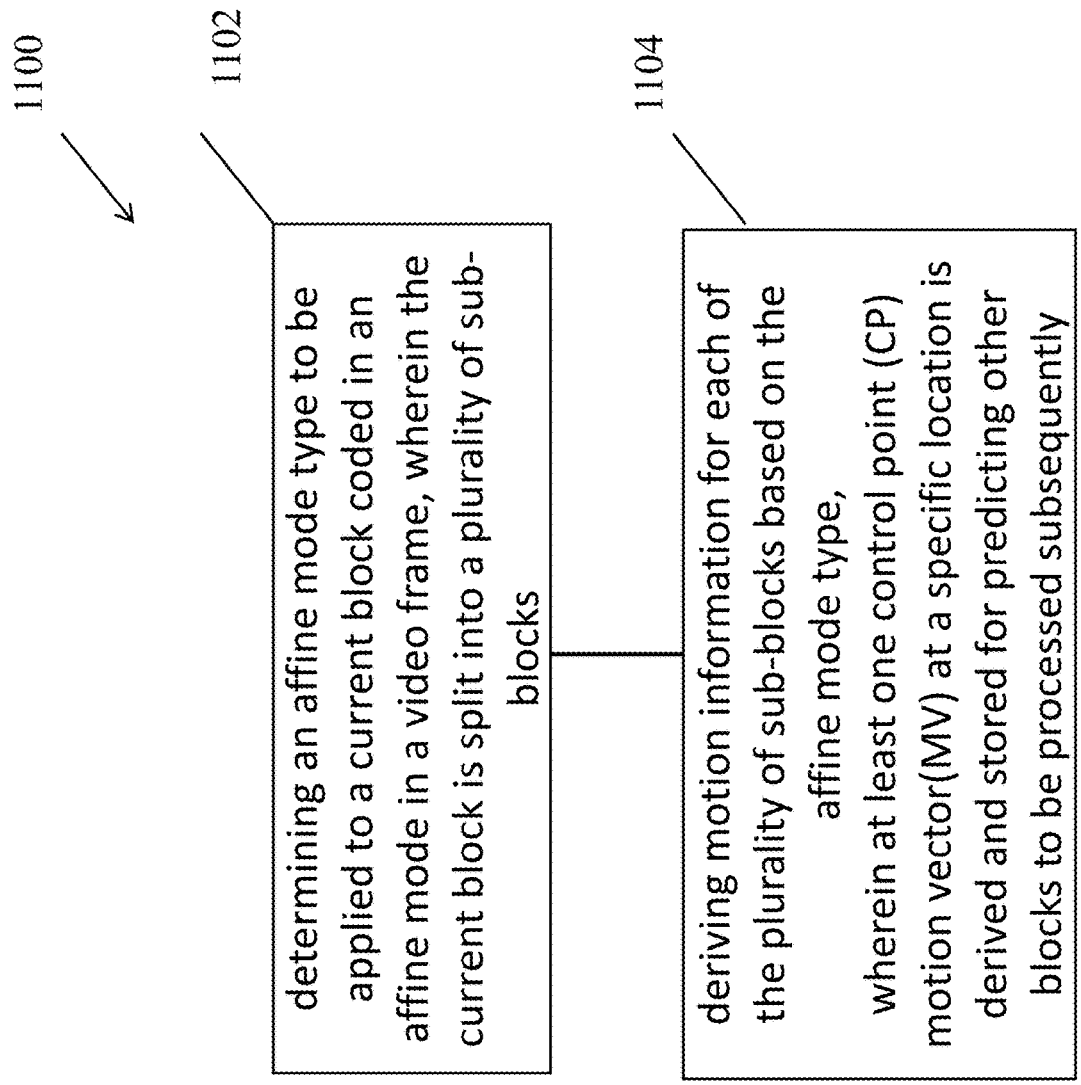
FIG. 11 is a flowchart for an example method of visual media processing.

FIG. 11 is a flowchart representation of a method 1100 of video processing. The method 1100 includes determining (1102) an affine mode type to be applied to a current block coded in an affine mode in a video frame, wherein the current block is split into a plurality of sub-blocks; and deriving (1104) motion information for each of the plurality of sub-blocks based on the affine mode type. In an example, at least one control point (CP) motion vector (MV) at a specific location is derived and stored for predicting other blocks to be processed subsequently.

Figure 12:
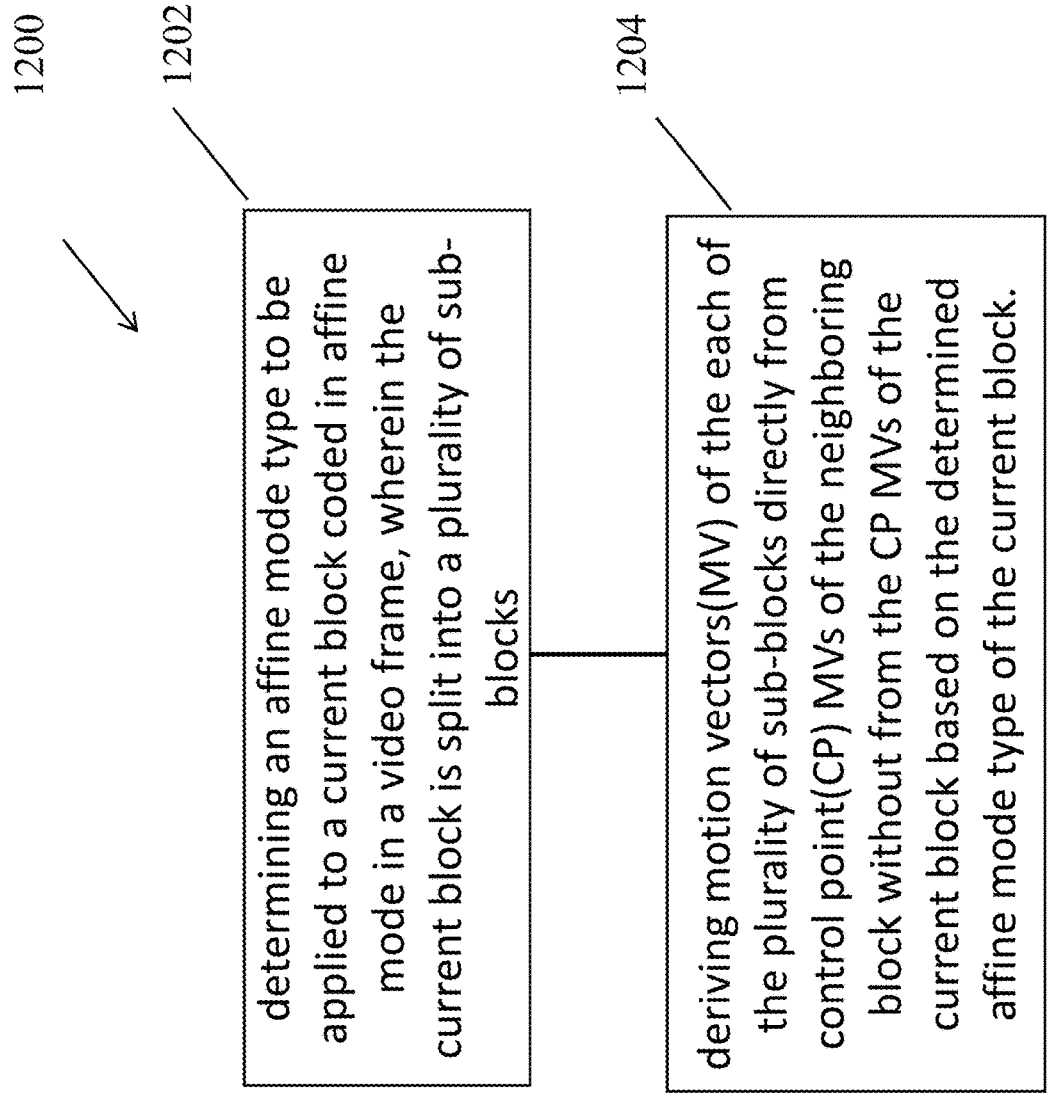
FIG. 12 is a flowchart for an example method of visual media processing.

FIG. 12 is a flowchart representation of a method 1200 of video processing. The method 1200 includes determining (1202) an affine mode type to be applied to a current block coded in affine mode in a video frame, wherein the current block is split into a plurality of sub-blocks; and deriving (1204) motion vectors (MV) of the each of the plurality of sub-blocks directly from control point (CP) MVs of the neighboring block without from the CP MVs of the current block based on the determined affine mode type of the current block.

Various examples of the neighborhood condition are described in the Technique 1 section.

For example, in some embodiments, the neighboring condition corresponds to a size or a position of a neighboring block. The neighbouring block may be a CU or a PU.

In some embodiments, the neighborhood condition specifies to inherit affine motion prediction from the neighboring block that is in a specific direction from the current block, wherein the specific direction includes at least one of left, above, above-right, above-left or bottom-right.

In some embodiments, control point (CP) motion vectors of the current block are derived from a top-right motion vector and a bottom-right motion vector of an affine-coded neighboring block. In some embodiments, the current block does not use a 6-parameter affine model, and wherein the deriving the control point motion vectors includes using previously derived and stored motion vectors. In some embodiments, motion vectors of sub-blocks of the current block are derived from control point motion vectors of one or more neighbouring blocks.

With reference to the above methods, the conversion between the bitstream representation and the video block may include, during encoding, generating bitstream representation from (uncompressed) video block and, during decoding, generating the video block from its bitstream representation.

In another example aspect, a visual media processing method is disclosed. The method includes performing conversion between a video block and a bitstream representation thereof using candidate list for sub-block motion candidates for the video block. An inserting order of motion candidates in the candidate list is dependent on coded information of the video block or neighbouring blocks of the video block.

In some embodiments, the inserting order is dependent on affine coding status of a neighbouring block. In some embodiments, the inserting order starts with inherited affine candidate motion vectors. Alternatively, it may be the last entry in the inserting order. In some embodiments, the candidate list includes control point motion vectors that only refer to a same reference picture as the video block. In some embodiments, pruning may be applied to sub-block motion vectors. Additional implementation examples of this method are described with reference to Technique 2 section.

In some embodiments, the affine MVP candidate list is larger than the non-affine MVP candidate list. In some embodiments, the affine MVP candidate list is smaller than the non-affine MVP candidate list. In some embodiments, the affine MVP candidate list has a size that is adaptive depending on a number of neighbouring affine coded blocks. Additional examples of embodiments are described in Technique 3 section.

Various embodiments and techniques disclosed in the present document can be described in the following listing of examples.

1. A method of video processing, comprising: determining an affine mode type to be applied to a current block coded in an affine mode in a video frame, wherein the current block is split into a plurality of sub-blocks; and deriving motion information for each of the plurality of sub-blocks based on the affine mode type. In an example, at least one control point (CP) motion vector (MV) at a specific location is derived and stored for predicting other blocks to be processed subsequently.

2. The method of example 1, wherein the specific location of the current block comprises at least one of a bottom-left corner and a bottom-right corner of the current block.

3. The method of example 2, further comprising: deriving the CP MV at the bottom-left corner of the current block if the current block does not use a 6-parameter affine model.

4. The method of example 2 or 3, wherein the CP MV at the specific location of the current block is further used in a prediction of other frames to be processed subsequently or in a deblocking filtering process.

5. The method of example 1 or 4, wherein predicting the other blocks or other frames includes using affine model inheritance.

6. The method of example 2 or 3, wherein the CP MV at the bottom-left corner of the current block is stored in a bottom-left MV unit with a size of 4×4.

7. The method of example 6, wherein the CP MV ($mv_2^{h"}$, $mv_2^v$) at the bottom-left corner of the current block is derived for a 4-parameter affine model as $$\begin{cases} mv_2^h = -\dfrac{(mv_1^v - mv_0^v)}{w}h + mv_0^h \\ mv_2^v = \dfrac{(mv_1^h - mv_0^h)}{w}h + mv_0^v \end{cases} \quad (5)$$

wherein $(mv^h_0, mv^v_0)$ is a CP MV at a top-left corner of the current block, and $(mv^h_1, mv^h 1)$ is a CP MV at a top-right corner of the current block.

8. The method of example 2, wherein the CP MV at the bottom-right corner of the current block is stored in a bottom-right MV unit with a size of 4×4.

9. The method of example 8, wherein the CP MV $(mv_3^h, mv_3^h)$ at the bottom-right corner of the current block is derived for a 4-parameter affine model as $$\begin{cases} mv_3^h = mv_1^h - \frac{(mv_1^v - mv_0^v)}{w}h \\ mv_3^v = mv_1^v + \frac{(mv_1^h - mv_0^h)}{w}h \end{cases} \quad (6)$$

wherein $(mv^h_0, mv^v_0)$ is a CP MV at a top-left corner of the current block, and $(mv^h_1, mv^h 1)$ is a CP MV at a top-right corner of the current block.

10. The method of example 8, wherein the CP MV $(mv_3^h, mv_3^v)$ at the bottom-right corner of the current block is derived for the 6-parameter affine model as $$\begin{cases} mv_3^h = mv_1^h + mv_2^h - mv_0^h \\ mv_3^v = mv_1^v + mv_2^v - mv_0^v \end{cases} \quad (7)$$

wherein $(mv^h_0, mv^v_0)$ is a CP MV at a top-left corner of the current block, $(mv^h_1, mv^v_1)$ is a CP MV at a top-right corner of the current block, and $(mv_2^h, mv_2^h)$ a CP MV at a bottom-left corner of the current block.

11. The method of example 8, wherein the CP MV $(mv_3^h, mv_3^h)$ at the bottom-right corner of the current block is derived for both a 4-parameter affine model and the 6-parameter affine model as $$\begin{cases} mv_3^h = mv_1^h + mv_2^h - mv_0^h \\ mv_3^v = mv_1^v + mv_2^v - mv_0^v \end{cases} \quad (8)$$

if $mv_2=(mv_2^h, mv_2^v)$ is derived from $$\begin{cases} mv_2^h = -\frac{(mv_1^v - mv_0^v)}{w}h + mv_0^h \\ mv_2^v = \frac{(mv_1^h - mv_0^h)}{w}h + mv_0^v \end{cases}$$

wherein $(mv^h_0, mv^v_0)$ is a CP MV at a top-left corner of the current block, and $(mv^h_0, mv^h_0)$ is a CP MV at a top-right corner of the current block.

12. A method of video processing, comprising: determining an affine mode type to be applied to a current block coded in affine mode in a video frame, wherein the current block is split into a plurality of sub-blocks; and deriving motion vectors (MV) of the each of the plurality of sub-blocks directly from control point (CP) MVs of the neighboring block without from the CP MVs of the current block based on the determined affine mode type of the current block.

13. The method of example 12, wherein the affine mode type is an affine merge mode.

14. The method of example 13, wherein the MVs of each of the plurality of sub-blocks are derived as $$\begin{cases} mv^h(x, y) = \frac{(mv_1^h - mv_0^h)}{w}(x - x_0) - \frac{(mv_1^v - mv_0^v)}{w}(y - y_0) + mv_0^h \\ mv^v(x, y) = \frac{(mv_1^v - mv_0^v)}{w}(x - x_0) + \frac{(mv_1^h - mv_0^h)}{w}(y - y_0) + mv_0^v \end{cases}$$

if the neighboring block is coded with the 4-parameter affine model;

or derived as $$\begin{cases} mv^h(x, y) = \frac{(mv_1^h - mv_0^h)}{w}(x - x_0) + \frac{(mv_2^h - mv_0^h)}{h}(y - y_0) + mv_0^h \\ mv^v(x, y) = \frac{(mv_1^v - mv_0^v)}{w}(x - x_0) + \frac{(mv_2^v - mv_0^v)}{h}(y - y_0) + mv_0^v \end{cases}$$

if the neighboring block is coded with the 6-parameter affine model, wherein $(mv^h(x, y), mv^v(x, y))$ represents the MV of the sub-block, $(x, y)$ is a coordinate of a center of the sub-block, $(mv^h_0, mv^v_0)$ represents a CP MV at a top-left corner of the neighbouring block, $(mv^h_1, mv^v_1)$ represents a CP MV at a top-right corner of the neighbouring block, and $(mv^h_2, mv^v_2)$ represents a CP MV at the bottom-left corner of the neighbouring block, w and h are a width and height of the neighbouring block, $(x_0, y_0)$ is a coordinate of the top-left corner of the neighbouring block.

15. The method of example 13, wherein the neighboring block is located above to the current block, and an affine model inheritance for each of the plurality of sub-blocks is conducted according to a CP MV at a bottom-left corner and a CP MV at a bottom-right corner of the affine-coded neighboring block.

16. The method of example 15, wherein the MVs of each of the plurality of the sub-blocks are derived as $$\begin{cases} a = \frac{(mv_1^h - mv_0^h)}{w} \\ b = \frac{(mv_1^v - mv_0^v)}{w} \end{cases}$$

$$\begin{cases} mv^h(x, y) = a(x - x_0) - b(y - y_0) + mv_0^h \\ mv^v(x, y) = b(x - x_0) + a(y - y_0) + mv_0^v \end{cases}$$

wherein $(mv^h(x, y), mv^v(x, y))$ represents the MV of the sub-block, $(x, y)$ is a coordinate of a center of the sub-block, $(mv^h_0, mv^v_0)$ is the CP MV at the bottom-left corner of the neighbouring block, $(mv^h_1, mv^h_1)$ is the CP MV of the bottom-right corner of the neighbouring block, w is a width of the neighbouring block, $(x_0, y_0)$ is a coordinate of the bottom-left corner of the neighbouring block.

17. The method of example 13, wherein the neighboring block is located left to the current block, and an affine model inheritance for each of the plurality of sub-blocks is conducted according to a CP MV at a top-right corner and a CP MV at a bottom-right corner of the affine-coded neighboring block.

18. The method of example 17, wherein the MVs of each of the plurality of the sub-blocks are derived as $$\begin{cases} a = \dfrac{(mv_1^v - mv_0^v)}{h} \\ b = -\dfrac{(mv_1^h - mv_0^h)}{h} \end{cases}$$

$$\begin{cases} mv^h(x, y) = a(x - x_0) - b(y - y_0) + mv_0^h \\ mv^v(x, y) = b(x - x_0) + a(y - y_0) + mv_0^v \end{cases}$$

wherein $(mv^h(x, y), mv^v(x, y))$ represents the MV of the sub-block, $(x, y)$ is a coordinate of a center of the sub-block, $(mv^h_0, mv^v_0)$ is the CP MV at the top-right corner of the neighbouring block, $(mv^h_1, mv^v_1)$ is the CP MV of the bottom-right corner of the neighbouring block, h is a height of the neighbouring block, $(x_0, y_0)$ is a coordinate of the top-right corner of the neighbouring block.

19. The method of any one of examples 1-18, wherein the video processing comprises at least one of encoding the video block into the bitstream representation of the video block and decoding the video block from the bitstream representation of the video block 20. An apparatus in a video system comprising a processor and a non-transitory memory with instructions thereon, wherein the instructions upon execution by the processor, cause the processor to implement the method recited in any one of examples 1 to 19.

21. A computer program product stored on a non-transitory computer readable media, the computer program product including program code for carrying out the method recited in any one of examples 1 to 19.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   determining, for a conversion between a current block of a video and a bitstream of the video, an affine mode type to be applied to the current block, wherein the current block is split into a plurality of sub-blocks; and
   deriving motion information for each of the plurality of sub-blocks based on the affine mode type,
   wherein at least one control point motion vector (CPMV) at one or more specific locations within the current block are derived and stored for predicting other blocks to be processed subsequently, and wherein the one or more specific locations within the current block comprise both a bottom-left corner and a bottom-right corner of the current block, and
   wherein the other blocks to be processed subsequently comprise a neighboring block to be processed subsequently, and when a candidate list for the neighboring block to be processed subsequently is constructed at least based on the current block, an inserting order of motion candidates to be added to the candidate list depends on the affine mode type of the current block and/or a coding type of the neighboring block to be processed subsequently.

2. The method of claim 1, further comprising:
   deriving the CPMV at the bottom-left corner of the current block in response to the current block not using a 6-parameter affine model.

3. The method of claim 1, wherein the CPMV at the one or more specific locations of the current block is further used in a prediction of other frames to be processed subsequently or in a deblocking filtering process, and wherein the predicting the other blocks or the prediction of the other frames includes using affine model inheritance.

4. The method of claim 1, wherein the CPMV at the bottom-left corner of the current block is stored in a bottom-left MV unit with a size of 4×4.

5. The method of claim 4, wherein the CPMV ($mv_2^h$, $mv_2^v$) at the bottom-left corner of the current block is derived for a 4-parameter affine model as $$\begin{cases} mv_2^h = -\frac{(mv_1^v - mv_0^v)}{w}h + mv_0^h \\ mv_2^v = \frac{(mv_1^h - mv_0^h)}{w}h + mv_0^v \end{cases}$$

wherein ($mv_0^h$, $mv_0^v$) is a CPMV at a top-left corner of the current block, and ($mv_1^h$, $mv_1^v$) is a CPMV at a top-right corner of the current block.

6. The method of claim 1, wherein the CPMV at the bottom-right corner of the current block is stored in a bottom-right MV unit with a size of 4×4.

7. The method of claim 6, wherein the CPMV ($mv_3^h$, $mv_3^v$) at the bottom-right corner of the current block is derived for a 4-parameter affine model as $$\begin{cases} mv_3^h = mv_1^h - \frac{(mv_1^v - mv_0^v)}{w}h \\ mv_3^v = mv_1^v + \frac{(mv_1^h - mv_0^h)}{w}h \end{cases}$$

wherein ($mv_0^h$, $mv_0^v$) is a CPMV at a top-left corner of the current block, and ($mv_1^h$, $mv_1^v$) is a CPMV at a top-right corner of the current block.

8. The method of claim 6, wherein the CPMV ($mv_3^h$, $mv_3^v$) at the bottom-right corner of the current block is derived for a 6-parameter affine model as $$\begin{cases} mv_3^h = mv_1^h + mv_2^h - mv_0^h \\ mv_3^v = mv_1^v + mv_2^v - mv_0^v \end{cases}$$

wherein ($mv_0^h$, $mv_0^v$) is a CPMV at a top-left corner of the current block, ($mv_1^h$, $mv_1^v$) is a CPMV at a top-right corner of the current block, and ($mv_2^h$, $mv_2^v$) is the CPMV at the bottom-left corner of the current block.

9. The method of claim 6, wherein the CPMV ($mv_3^h$, $mv_3^v$) at the bottom-right corner of the current block is derived for both a 4-parameter affine model and a 6-parameter affine model as $$\begin{cases} mv_3^h = mv_1^h + mv_2^h - mv_0^h \\ mv_3^v = mv_1^v + mv_2^v - mv_0^v \end{cases}$$

in response to a CPMV $mv_2$=($mv_2^h$, $mv_2^v$) at the bottom-left corner of the current block being derived from the 4-parameter affine model as $$\begin{cases} mv_2^h = -\frac{(mv_1^v - mv_0^v)}{w}h + mv_0^h \\ mv_2^v = \frac{(mv_1^h - mv_0^h)}{w}h + mv_0^v \end{cases},$$

wherein ($mv_0^h$, $mv_0^v$) is a CPMV at a top-left corner of the current block, and ($mv_1^h$, $mv_1^v$) is a CPMV at a top-right corner of the current block.

10. The method of claim 1, wherein motion vectors (MVs) of each of the plurality of sub-blocks are directly derived from at least one CPMV of a neighboring block without being indirectly derived from the CPMV of the current block based on the affine mode type, and wherein the affine mode type is an affine merge mode.

11. The method of claim 10, wherein the neighboring block is located above to the current block, and an affine model inheritance for each of the plurality of sub-blocks is conducted according to a CPMV at a bottom-left corner and a CPMV at a bottom-right corner of the neighboring block that is affine-coded.

12. The method of claim 11, wherein the MVs of each of the plurality of sub-blocks are derived as $$\begin{cases} a = \frac{(mv_1^h - mv_0^h)}{w} \\ b = \frac{(mv_1^v - mv_0^v)}{w} \end{cases}$$

$$\begin{cases} mv^h(x, y) = a(x - x_0) - b(y - y_0) + mv_0^h \\ mv^v(x, y) = b(x - x_0) + a(y - y_0) + mv_0^v \end{cases}$$

wherein ($mv^h(x, y)$, $mv^v(x, y)$) represents the MV of a sub-block, (x, y) is a coordinate of a center of the sub-block, ($mv_0^h$, $mv_0^v$) is the CPMV at the bottom-left corner of a neighbouring block, ($mv_1^h$, $mv_1^v$) is the CPMV of the bottom-right corner of the neighbouring block, w is a width of the neighbouring block, ($x_0$, $y_0$) is a coordinate of the bottom-left corner of the neighbouring block.

13. The method of claim 10, wherein the neighboring block is located left to the current block, and an affine model inheritance for each of the plurality of sub-blocks is conducted according to a CPMV at a top-right corner and a CPMV at a bottom-right corner of the neighboring block that is affine-coded.

14. The method of claim 13, wherein the MVs of each of the plurality of sub-blocks are derived as $$\begin{cases} a = \dfrac{(mv_1^v - mv_0^v)}{h} \\ b = -\dfrac{(mv_1^h - mv_0^h)}{h} \end{cases}$$

$$\begin{cases} mv^h(x, y) = a(x - x_0) - b(y - y_0) + mv_0^h \\ mv^v(x, y) = b(x - x_0) + a(y - y_0) + mv_0^v \end{cases}$$

wherein $(mv^h(x, y), mv^h(x, y))$ represents the MV of a sub-block, $(x, y)$ is a coordinate of a center of the sub-block, $(mv_0^h, mv_0^v)$ is the CPMV at the top-right corner of a neighbouring block, $(mv_1^h, mv_1^v)$ is the CPMV of the bottom-right corner of the neighbouring block, h is a height of the neighbouring block, $(x_0, y_0)$ is a coordinate of the top-right corner of the neighbouring block.

15. The method of claim 1, wherein the MVs of each of the plurality of sub-blocks are derived as $$\begin{cases} mv^h(x, y) = \dfrac{(mv_1^h - mv_0^h)}{w}(x - x_0) - \dfrac{(mv_1^v - mv_0^v)}{w}(y - y_0) + mv_0^h \\ mv^v(x, y) = \dfrac{(mv_1^v - mv_0^v)}{w}(x - x_0) + \dfrac{(mv_1^h - mv_0^h)}{w}(y - y_0) + mv_0^v \end{cases}$$

in response to the neighboring block being coded with a 4-parameter affine model;
or derived as $$\begin{cases} mv^h(x, y) = \dfrac{(mv_1^h - mv_0^h)}{w}(x - x_0) + \dfrac{(mv_2^h - mv_0^h)}{h}(y - y_0) + mv_0^h \\ mv^v(x, y) = \dfrac{(mv_1^v - mv_0^v)}{w}(x - x_0) + \dfrac{(mv_2^v - mv_0^v)}{h}(y - y_0) + mv_0^v \end{cases}$$

in response to the neighboring block being coded with a 6-parameter affine model,
wherein $(mv^h(x, y), mv^v(x, y))$ represents the MV of a sub-block, $(x, y)$ is a coordinate of a center of the sub-block, $(mv_0^h, mv_0^v)$ represents a CPMV at a top-left corner of a neighbouring block, $(mv_1^h, mv_1^v)$ represents a CPMV at a top-right corner of the neighbouring block, and $(mv_2^h, mv_2^v)$ represents a CPMV at a bottom-left corner of the neighbouring block, w and h are a width and height of the neighbouring block, $(x_0, y_0)$ is a coordinate of the top-left corner of the neighbouring block.

16. The method of claim 1, wherein the conversion includes encoding the current block into the bitstream.

17. The method of claim 1, wherein the conversion includes decoding the current block from the bitstream.

18. An apparatus for processing video data comprising a processor and a non-transitory memory with instructions thereon, wherein the instructions upon execution by the processor, cause the processor to:
determine, for a conversion between a current block of a video and a bitstream of the video, an affine mode type to be applied to the current block, wherein the current block is split into a plurality of sub-blocks; and
derive motion information for each of the plurality of sub-blocks based on the affine mode type,
wherein at least one control point motion vector (CPMV) at one or more specific locations within the current block are derived and stored for predicting other blocks to be processed subsequently, and wherein the specific one or more locations within the current block comprise both a bottom-left corner and a bottom-right corner of the current block, and
wherein the other blocks to be processed subsequently comprise a neighboring block to be processed subsequently, and when a candidate list for the neighboring block to be processed subsequently is constructed at least based on the current block, an inserting order of motion candidates to be added to the candidate list depends on the affine mode type of the current block and/or a coding type of the neighboring block to be processed subsequently.

19. A non-transitory computer-readable recording medium storing a bitstream of a video which is generated by a method performed by a video processing apparatus, wherein the method comprises:
determining, for a current block of the video, an affine mode type to be applied to the current block, wherein the current block is split into a plurality of sub-blocks;
deriving motion information for each of the plurality of sub-blocks based on the affine mode type, and
generating the bitstream based on the determining,
wherein at least one control point motion vector (CPMV) at one or more specific locations within the current block are derived and stored for predicting other blocks to be processed subsequently, and wherein the specific one or more locations within the current block comprise both a bottom-left corner and a bottom-right corner of the current block, and
wherein the other blocks to be processed subsequently comprise a neighboring block to be processed subsequently, and when a candidate list for the neighboring block to be processed subsequently is constructed at least based on the current block, an inserting order of motion candidates to be added to the candidate list depends on the affine mode type of the current block and/or a coding type of the neighboring block to be processed subsequently.

* * * * *